United States Patent
Uchida et al.

(10) Patent No.: US 11,535,777 B2
(45) Date of Patent: Dec. 27, 2022

(54) DOUBLE-SIDED PRESSURE-SENSITIVE ADHESIVE SHEET, LAMINATE COMPRISING COMPONENT MEMBER FOR IMAGE DISPLAY DEVICE, KIT FOR LAMINATE FORMATION, AND USE OF DOUBLE-SIDED PRESSURE-SENSITIVE ADHESIVE SHEET

(71) Applicant: Mitsubishi Chemical Corporation, Tokyo (JP)

(72) Inventors: Takahisa Uchida, Tokyo (JP); Naoya Miara, Tokyo (JP); Hidejirou Yoshikawa, Tokyo (JP); Ryouta Yamamoto, Tokyo (JP); Shinya Fukuda, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 509 days.

(21) Appl. No.: 16/576,868

(22) Filed: Sep. 20, 2019

(65) Prior Publication Data

US 2020/0017722 A1 Jan. 16, 2020

Related U.S. Application Data

(63) Continuation of application No. PCT/JP2018/010061, filed on Mar. 14, 2018.

(30) Foreign Application Priority Data

Mar. 23, 2017 (JP) .............................. JP2017-058211

(51) Int. Cl.
| | | |
|---|---|---|
| C09J 7/29 | (2018.01) | |
| C09J 7/38 | (2018.01) | |
| C09J 9/00 | (2006.01) | |
| C09J 5/00 | (2006.01) | |
| C09J 7/10 | (2018.01) | |

(52) U.S. Cl.
CPC . C09J 7/29 (2018.01); C09J 5/00 (2013.01); C09J 7/10 (2018.01); C09J 7/385 (2018.01); C09J 9/00 (2013.01); C09J 2203/326 (2013.01); C09J 2301/414 (2020.08); C09J 2433/00 (2013.01)

(58) Field of Classification Search
CPC ......... C09J 7/29; C09J 5/00; C09J 7/10; C09J 7/385; C09J 9/00; C09J 2203/326; C09J 2301/414; C09J 2433/00; C09J 2203/325; C09J 11/06; C09J 133/04; C09J 2301/124; C09J 2301/312
See application file for complete search history.

(56) References Cited

U.S. PATENT DOCUMENTS

| | | |
|---|---|---|
| 5,073,611 A | 12/1991 | Rehmer et al. |
| 9,109,141 B2 | 8/2015 | Inenaga |
| 9,353,293 B2 | 5/2016 | Niimi et al. |
| 9,394,465 B2 | 7/2016 | Inenaga |
| 9,868,880 B2 | 1/2018 | Jeong et al. |
| 2011/0195240 A1 | 8/2011 | Inenaga |
| 2011/0300377 A1 | 12/2011 | Koyama et al. |
| 2012/0156456 A1 | 6/2012 | Niimi et al. |
| 2013/0005915 A1 | 1/2013 | Suzuki et al. |
| 2013/0273354 A1 | 10/2013 | Horio |
| 2014/0044908 A1 | 2/2014 | Inenaga |
| 2014/0065417 A1 | 3/2014 | Higashi et al. |
| 2015/0044423 A1 | 2/2015 | Niimi et al. |
| 2015/0152293 A1 | 6/2015 | Jeong et al. |
| 2016/0237319 A1* | 8/2016 | Takarada .................. B32B 7/06 |

FOREIGN PATENT DOCUMENTS

| | | |
|---|---|---|
| CN | 103492516 A | 1/2014 |
| CN | 105452410 A | 3/2016 |
| CN | 105885717 A | 8/2016 |
| JP | H02-305847 A | 12/1990 |
| JP | 2009-114223 A | 5/2009 |
| JP | 2012-181418 A | 9/2012 |
| JP | 2012-229372 A | 11/2012 |
| JP | 2012-246477 A | 12/2012 |
| JP | 2014-156552 A | 8/2014 |
| JP | 2016-108555 A | 6/2016 |
| JP | 2016-121305 A | 7/2016 |
| JP | 2016-151580 A | 8/2016 |
| KR | 10-2011-0127136 A | 11/2011 |
| KR | 10-2016-0076974 A | 7/2016 |
| KR | 2016-0117959 A | 10/2016 |
| TW | 201522551 A | 6/2015 |
| TW | 201639935 A | 11/2016 |
| WO | 2007/029557 A1 | 3/2007 |
| WO | 2010/044229 A1 | 4/2010 |
| WO | 2010/067896 A1 | 6/2010 |
| WO | 2011/129200 A1 | 10/2011 |
| WO | 2012/043341 A1 | 4/2012 |
| WO | 2012/132115 A1 | 10/2012 |
| WO | 2013/108565 A1 | 7/2013 |

OTHER PUBLICATIONS

Office Action issued in corresponding Chinese Patent Application No. 201880019906.4 dated May 7, 2021.

(Continued)

Primary Examiner — Daniel H Lee
(74) Attorney, Agent, or Firm — Morgan, Lewis & Bockius LLP

(57) ABSTRACT

To provide a double-sided pressure-sensitive adhesive sheet having high flexing resistance that does not suffer flexure and exfoliation in a flexing test that is closer to the actual use environment. A double-sided pressure-sensitive adhesive sheet having no substrate, containing a pressure-sensitive adhesive composition containing a (meth)acrylate ester (co) polymer (A), and having a glass transition temperature (Tg) defined by a Tan δ peak temperature of dynamic viscoelasticity in a range of −50° C. to −20° C., a storage elastic modulus G' at a frequency of 1 Hz and a temperature 100° C. in a range of $2.0 \times 10^3$ to $3.0 \times 10^4$ Pa, and a thickness of 10 μm or more and 150 μm or less.

22 Claims, 1 Drawing Sheet

(56) References Cited

OTHER PUBLICATIONS

Office Action issued in corresponding Taiwanese Patent Application No. 107109436 dated Nov. 22, 2021.
International Search Report issued in related International Patent Application No. PCT/JP2018/010061 dated Jun. 5, 2018.
Infomnation Statement received in corresponding Japanese Patent Application No. 2019-507600 dated Dec. 25, 2020.
Office Action issued in corresponding Japanese Patent Application No. 2012-507600 dated Nov. 30, 2021.
Office Action issued in corresponding Korean Patent Application No. 20019-7030834 dated Mar. 30, 2022.

* cited by examiner

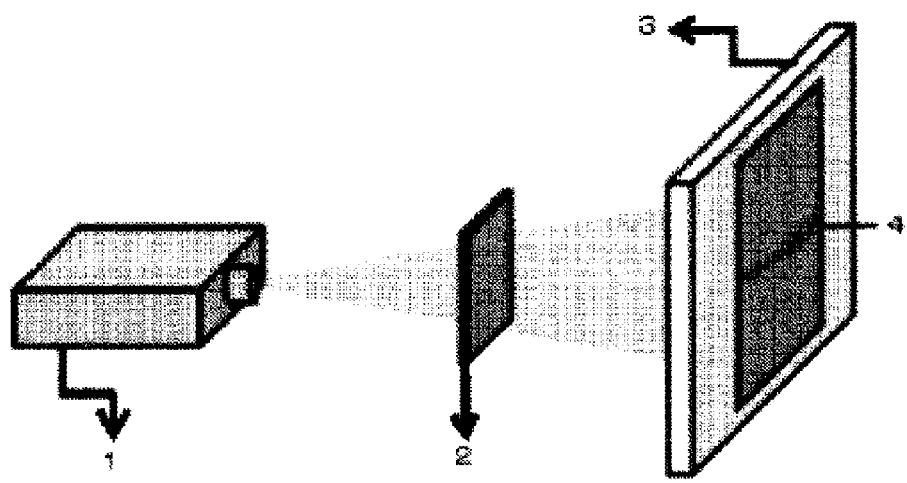

DOUBLE-SIDED PRESSURE-SENSITIVE ADHESIVE SHEET, LAMINATE COMPRISING COMPONENT MEMBER FOR IMAGE DISPLAY DEVICE, KIT FOR LAMINATE FORMATION, AND USE OF DOUBLE-SIDED PRESSURE-SENSITIVE ADHESIVE SHEET

TECHNICAL FIELD

The present invention relates to a double-sided pressure-sensitive adhesive sheet that is capable of being favorably used for adhesion of two component members for constituting an image display device, particularly component members for constituting a flexible display device capable of being flexed or curved (i.e., a so-called a flexible component member), and the use and the like thereof.

BACKGROUND ART

In recent years, for enhancing the visibility of an image display device, such a measure has been performed that a gap between an image display panel, such as a liquid crystal display (LCD), a plasma display (PDP), and an electronic luminescent display (ELD), and a protective panel or a touch-sensitive panel disposed on the front side (viewing side) thereof is filled with an adhesive, so as to suppress the reflection of the incident light and the outgoing light from the displayed image at the interface of the air layer.

Currently, as the image display panel, a flat display panel, such as a liquid crystal display (LCD), is mainly used.

As the method for filling the gap between the component members for constituting an image display device, a method of filling by using a pressure-sensitive adhesive sheet has been known.

For example, PTL 1 describes a pressure-sensitive adhesive sheet that is capable of suppressing the generation of visible bubbles in adhesion not only under ordinary pressure but also under a reduced pressure environment even though a foreign matter is present on the surface to be bonded, and has properties with a storage shear elastic modulus within a range of $5\times10^2$ Pa or more and $1\times10^4$ Pa or less at both frequencies of $10^{-3}$ Hz and $10^{-5}$ Hz based on the 20° C. standard master curve.

PTL 2 describes a new transparent pressure-sensitive adhesive sheet that does not become sticky at a cut end surface with the lapse of time, when a laminate having layers bonded with the pressure-sensitive adhesive sheet is cut into pieces, is capable of adhering without bubbles remaining even though the adherend surface has unevenness, is further capable of adhering without bubbling even though the adherend is formed of a material outgassing, such as plastics, includes one or more layers of each of first and second pressure-sensitive adhesive layers different in viscoelastic behavior, has a structure formed by integrating the layers, and has a dynamic storage shear elastic modulus G' of $2\times10^4$ to $5\times10^5$ Pa at 20° C. and $1\times10^4$ to $1\times10^5$ Pa at 150° C. as measured at a temperature variance with a frequency of 1 Hz.

PTL 3 describes a transparent double-sided pressure-sensitive adhesive sheet that not only is excellent in conformity to steps and unevenness on a printed portion when adhering to an adherend, but also is excellent in workability, such as cutting capability, includes an intermediate resin layer (A) and pressure-sensitive adhesive layers (B) as front and back surface layers, in which the layers each contain one or more (meth)acrylate ester (co)polymers as a base resin and the intermediate resin layer (A) has, in a temperature range of 0° C. to 100° C., a storage shear elastic modulus (G'(A)) higher than that of the pressure-sensitive adhesive layers (B) at a frequency of 1 Hz, and entirely has an indentation hardness (Asker C2 hardness) of 10 to 80.

PTL 4 describes a transparent double-sided pressure-sensitive adhesive sheet for an image display device, which is used for bonding an image display device-constituting member, which has a step portion and a flat portion in a surface to be bonded, to another image display device-constituting member. The transparent double-sided pressure-sensitive adhesive sheet for an image display device has a thickest portion with a thickness of 250 μm or less, and has a gel fraction (a) of 10% or more at a position in contact with the step portion after bonding, which is smaller than the gel fraction (b) at a position in contact with the flat portion.

In recent years, a flexible display capable of being freely flexed is receiving attention as a next-generation display. As the flexible display, an organic electronic luminescent (organic EL) display is mainly used.

The flexible display uses a flexible and thin glass substrate or a plastic display, and therefore a double-sided pressure-sensitive adhesive sheet used for adhering component members constituting the image display device is not only demanded to have the optical characteristics and the durability having been demanded in the ordinary flat display panel, but also demanded to be prevented from suffering flexure, exfoliation, and blistering in a flexing test.

As a pressure-sensitive adhesive sheet capable of being used for the flexible display, PTL 5 describes a pressure-sensitive adhesive sheet for an optical film including a pressure-sensitive adhesive for an optical film containing a (meth)acrylate ester copolymer (A), the (meth)acrylate ester copolymer (A) having a glass transition temperature of −70° C. or more and −55° C. or less and a weight average molecular weight of more than 1,000,000 and 2,500,000 or less.

CITATION LIST

Patent Literatures

PTL 1: WO 2007/029557
PTL 2: WO 2010/044229
PTL 3: WO 2011/129200
PTL 4: WO 2013/108565
PTL 5: JP 2016-108555 A

SUMMARY OF INVENTION

Technical Problem

Associated with the innovative progress of the display techniques, the double-sided pressure-sensitive adhesive sheet for adhering component members for constituting an image display device constituting the display involves emerging issues.

Since the component members for constituting an image display device constituting a flexible display are capable of being freely flexed, the double-sided pressure-sensitive adhesive sheet used for adhering the component members is demanded to have flexing resistance preventing flexure, exfoliation, and blistering after a flexing test, but there has been no established flexing test method.

Accordingly, a double-sided pressure-sensitive adhesive sheet having high flexing resistance that does not suffer flexure and exfoliation under conditions that are closer to the actual use environment conditions is demanded.

Under the circumstances, an object of the present invention is to provide a double-sided pressure-sensitive adhesive sheet having high flexing resistance that does not suffer flexure and exfoliation in a flexing test that is closer to the actual use environment, and to provide a method for using the double-sided pressure-sensitive adhesive sheet in adhering flexible component members for constituting an image display device, a laminate including a flexible component member for constituting an image display device obtained with the double-sided pressure-sensitive adhesive sheet, and a laminate forming kit for forming the laminate.

Solution to Problem

PTL 5 describes that the (meth)acrylate ester copolymer constituting the pressure-sensitive adhesive sheet that has a glass transition temperature of −70° C. or more and −55° C. or less is excellent in adhesion force and forms a pressure-sensitive adhesive sheet having flexing resistance.

However, as a result of the detailed studies by the present inventors on the relationship between the characteristics and the flexing resistance of the double-sided pressure-sensitive adhesive sheet, it has been found that in the case where the thickness of the double-sided pressure-sensitive adhesive sheet is in a range of 10 μm or more and 150 μm or less, it is important that (1) the (meth)acrylate ester copolymer constituting the double-sided pressure-sensitive adhesive sheet has a glass transition temperature of −50° C. or more and −20° C. or less, and (2) the double-sided pressure-sensitive adhesive sheet has a storage elastic modulus G' at a frequency of 1 Hz and a temperature of 100° C. in a range of $2.0 \times 10^3$ to $3.0 \times 10^4$ Pa, and thus the present invention has been completed.

The present inventors have also found that (3) when an exponential curve passing through two points of the storage elastic modulus G' (100) at a frequency of 1 Hz and a temperature of 100° C. and the storage elastic modulus G'(150) at a frequency of 1 Hz and a temperature of 150° C. is drawn for the double-sided pressure-sensitive adhesive sheet in a storage elastic modulus-temperature graph plotting the temperature as the abscissa axis and the logarithm of the storage shear elastic modulus (G') as the ordinate axis for the double-sided pressure-sensitive adhesive sheet, the double-sided pressure-sensitive adhesive sheet that has the natural logarithm of the base of the exponential curve of −0.01 or more has better flexing resistance, and thus the present invention has been completed.

The substance of the present invention resides in the following.

[1] A laminate including a flexible component member for constituting an image display device capable of being flexed or curved, and a double-sided pressure-sensitive adhesive sheet having no substrate, the double-sided pressure-sensitive adhesive sheet containing a pressure-sensitive adhesive composition containing a (meth)acrylate ester (co)polymer (A), and having a thickness of 10 μm or more and 150 μm or less, a glass transition temperature (Tg) defined by a Tan δ peak temperature of dynamic viscoelasticity in a range of −50° C. to −20° C., and a storage elastic modulus G' at a frequency of 1 Hz and a temperature 100° C. in a range of $2.0 \times 10^3$ to $3.0 \times 10^4$ Pa.

[2] The laminate according to the item [1], wherein when an exponential curve is drawn to pass through two points of a storage elastic modulus G' (100) at a frequency of 1 Hz and a temperature of 100° C. and a storage elastic modulus G' (150) at a frequency of 1 Hz and a temperature of 150° C. in a storage elastic modulus-temperature graph plotting a temperature as the abscissa axis and a logarithm of a storage shear elastic modulus (G') as the ordinate axis for the double-sided pressure-sensitive adhesive sheet, the double-sided pressure-sensitive adhesive sheet has a natural logarithm of a base of the exponential curve of −0.01 or more.

[3] The laminate according to the item [1] or [2], wherein the pressure-sensitive adhesive composition further contains a crosslinking agent (B).

[4] The laminate according to any one of the items [1] to [3], wherein the pressure-sensitive adhesive composition further contains a photoinitiator (C).

[5] The laminate according to any one of the items [1] to [4], wherein the (meth)acrylate ester (co)polymer (A) does not contain a carboxy group-containing monomer as a (co)polymerization component, and contains at least any one or both of a hydroxy group-containing monomer and an amide group-containing monomer as a (co)polymerization component.

[6] The laminate according to any one of the items [1] to [5], wherein the (meth)acrylate ester (co)polymer (A) contains an alkyl (meth)acrylate having a (meth)acryloyl group bonded to a tertiary carbon atom as a (co)polymerization component.

[7] The laminate according to any one of the items [4] to [6], wherein the photoinitiator (C) is a hydrogen abstraction type photoinitiator.

[8] The laminate according to any one of the items [1] to [7], wherein the (meth)acrylate ester (co)polymer contains a monomer that generates a radical active species on receiving light.

[9] The laminate according to any one of the items [1] to [8], wherein the double-sided pressure-sensitive adhesive sheet has a storage elastic modulus G' at a frequency of 1 Hz and a temperature 50° C. in a range of $3.0 \times 10^2$ to $4.0 \times 10^4$ Pa.

[10] The laminate according to any one of the items [1] to [9], wherein the component member for constituting an image display device is a combination of two or more kinds in the group consisting of a surface protective panel, a touch-sensitive panel, an optical film, and an organic EL (electronic luminescent) display panel.

[11] The laminate according to any one of the items [1] to [10], wherein the laminate has a curved surface shape.

[12] A flexible display including the laminate according to any one of the items [1] to [11].

[13] A double-sided pressure-sensitive adhesive sheet having no substrate, containing a pressure-sensitive adhesive composition containing a (meth)acrylate ester (co) polymer (A), and having a glass transition temperature (Tg) defined by a Tan δ peak temperature of dynamic viscoelasticity in a range of −50° C. to −20° C., a storage elastic modulus G' at a frequency of 1 Hz and a temperature 100° C. in a range of $2.0 \times 10^3$ to $3.0 \times 10^4$ Pa, and a thickness of 10 μm or more and 150 μm or less.

[14] The double-sided pressure-sensitive adhesive sheet according to the item [13], wherein when an exponential curve is drawn to pass through two points of a storage elastic modulus G'(100) at a frequency of 1 Hz and a temperature of 100° C. and a storage elastic modulus G'(150) at a frequency of 1 Hz and a temperature of 150° C. in a storage elastic modulus-temperature graph plotting a temperature as the abscissa axis and a logarithm of a storage shear elastic modulus (G') as the ordinate axis for the double-sided pressure-sensitive adhesive sheet, the double-sided pressure-sensitive adhesive sheet has a natural logarithm of a base of the exponential curve of −0.010 or more.

[15] The double-sided pressure-sensitive adhesive sheet according to the item [13] or [14], wherein the pressure-sensitive adhesive composition further contains a crosslinking agent (B).

[16] The double-sided pressure-sensitive adhesive sheet according to any one of the items [13] to [15], wherein the pressure-sensitive adhesive composition further contains a photoinitiator (C).

[17] The double-sided pressure-sensitive adhesive sheet according to any one of the items [13] to [16], wherein the (meth)acrylate ester (co)polymer (A) does not contain a carboxy group-containing monomer as a (co)polymerization component, and contains at least any one or both of a hydroxy group-containing monomer and an amide group-containing monomer as a (co)polymerization component.

[18] The double-sided pressure-sensitive adhesive sheet according to any one of the items [13] to [17], wherein the (meth)acrylate ester (co)polymer (A) contains an alkyl (meth)acrylate having a (meth)acryloyl group bonded to a tertiary carbon atom as a (co)polymerization component.

[19] The double-sided pressure-sensitive adhesive sheet according to any one of the items [16] to [18], wherein the photoinitiator (C) is a hydrogen abstraction type photoinitiator.

[20] The double-sided pressure-sensitive adhesive sheet according to any one of the items [13] to [19], wherein the (meth)acrylate ester (co)polymer contains a monomer that generates a radical active species on receiving light.

[21] The double-sided pressure-sensitive adhesive sheet according to any one of the items [13] to [20], wherein the double-sided pressure-sensitive adhesive sheet has a storage elastic modulus G' at a frequency of 1 Hz and a temperature 50° C. in a range of $3.0 \times 10^2$ to $4.0 \times 10^4$ Pa.

[22] A double-sided pressure-sensitive adhesive sheet for adhering a flexible component member for constituting an image display device constituting a flexible display, the double-sided pressure-sensitive adhesive sheet including the double-sided pressure-sensitive adhesive sheet according to any one of the items [13] to [21].

[23] A kit for forming a laminate for constituting the laminate according to any one of the items [1] to [11], the kit including a flexible component member for constituting an image display device capable of being flexed or curved, and a double-sided pressure-sensitive adhesive sheet for adhering the flexible component member, the double-sided pressure-sensitive adhesive sheet containing a pressure-sensitive adhesive composition containing a (meth)acrylate ester (co)polymer (A), and having a thickness of 10 μm or more and 150 μm or less, a glass transition temperature (Tg) defined by a Tan δ peak temperature of dynamic viscoelasticity in a range of −50° C. to −20° C., and a storage elastic modulus G' at a frequency of 1 Hz and a temperature 100° C. in a range of $2.0 \times 10^3$ to $3.0 \times 10^4$ Pa.

[24] The kit for forming a laminate according to the item [23], wherein when an exponential curve is drawn to pass through two points of a storage elastic modulus G'(100) at a frequency of 1 Hz and a temperature of 100° C. and a storage elastic modulus G' (150) at a frequency of 1 Hz and a temperature of 150° C. in a storage elastic modulus-temperature graph plotting a temperature as the abscissa axis and a logarithm of a storage shear elastic modulus (G') as the ordinate axis for the double-sided pressure-sensitive adhesive sheet, the double-sided pressure-sensitive adhesive sheet has a natural logarithm of a base of the exponential curve of −0.010 or more.

[25] The kit for forming a laminate according to the item [23] or [24], wherein the pressure-sensitive adhesive composition further contains a crosslinking agent (B).

[26] The kit for forming a laminate according to any one of the items [23] to [25], wherein the pressure-sensitive adhesive composition further contains a photoinitiator (C).

[27] The kit for forming a laminate according to any one of the items [23] to [26], wherein the (meth)acrylate ester (co)polymer (A) does not contain a carboxy group-containing monomer as a (co)polymerization component, and contains at least any one or both of a hydroxy group-containing monomer and an amide group-containing monomer as a (co)polymerization component.

[28] The kit for forming a laminate according to any one of the items [23] to [27], wherein the (meth)acrylate ester (co)polymer (A) contains an alkyl (meth)acrylate having a (meth)acryloyl group bonded to a tertiary carbon atom as a (co)polymerization component.

[29] The kit for forming a laminate according to any one of the items [26] to [28], wherein the photoinitiator (C) is a hydrogen abstraction type photoinitiator.

[30] The kit for forming a laminate according to any one of the items [23] to [29], wherein the (meth)acrylate ester (co)polymer contains a monomer that generates a radical active species on receiving light.

[31] The kit for forming a laminate according to any one of the items [23] to [30], wherein the double-sided pressure-sensitive adhesive sheet has a storage elastic modulus G' at a frequency of 1 Hz and a temperature 50° C. in a range of $3.0 \times 10^2$ to $4.0 \times 10^4$ Pa.

[32] Use of a double-sided pressure-sensitive adhesive sheet for an adhering method of a flexible component member for constituting an image display device, the double-sided pressure-sensitive adhesive sheet having no substrate, containing a pressure-sensitive adhesive composition containing a (meth)acrylate ester (co)polymer (A), and having a thickness of 10 μm or more and 150 μm or less, a glass transition temperature (Tg) defined by a Tan δ peak temperature of dynamic viscoelasticity in a range of −50° C. to −20° C., and a storage elastic modulus G' at a frequency of 1 Hz and a temperature 100° C. in a range of $2.0 \times 10^3$ to $3.0 \times 10^4$ Pa.

[33] The use of a double-sided pressure-sensitive adhesive sheet for an adhering method of a flexible component member for constituting an image display device according to the item [32], wherein when an exponential curve is drawn to pass through two points of a storage elastic modulus G' (100) at a frequency of 1 Hz and a temperature of 100° C. and a storage elastic modulus G' (150) at a frequency of 1 Hz and a temperature of 150° C. in a storage elastic modulus-temperature graph plotting a temperature as the abscissa axis and a logarithm of a storage shear elastic modulus (G') as the ordinate axis for the double-sided pressure-sensitive adhesive sheet, the double-sided pressure-sensitive adhesive sheet has a natural logarithm of a base of the exponential curve of −0.010 or more.

[34] The use of a double-sided pressure-sensitive adhesive sheet for an adhering method of a flexible component member for constituting an image display device according to the item [32] or [33], wherein the pressure-sensitive adhesive composition further contains a crosslinking agent (B).

[35] The use of a double-sided pressure-sensitive adhesive sheet for an adhering method of a flexible component member for constituting an image display device according to any one of the items [32] to [34], wherein the pressure-sensitive adhesive composition further contains a photoinitiator (C).

[36] The use of a double-sided pressure-sensitive adhesive sheet for an adhering method of a flexible component member for constituting an image display device according to any one of the items [32] to [35], wherein the (meth)acrylate ester (co)polymer (A) does not contain a carboxy group-containing monomer as a copolymerization component, and contains at least any one or both of a hydroxy group-containing monomer and an amide group-containing monomer as a (co)polymerization component.

[37] The use of a double-sided pressure-sensitive adhesive sheet for an adhering method of a flexible component member for constituting an image display device according to any one of the items [32] to [36], wherein the (meth)acrylate ester (co)polymer (A) contains an alkyl (meth)acrylate having a (meth)acryloyl group bonded to a tertiary carbon atom as a (co)polymerization component.

[38] The use of a double-sided pressure-sensitive adhesive sheet for an adhering method of a flexible component member for constituting an image display device according to any one of the items [35] to [37], wherein the photoinitiator (C) is a hydrogen abstraction type photoinitiator.

[39] The use of a double-sided pressure-sensitive adhesive sheet for an adhering method of a flexible component member for constituting an image display device according to any one of the items [32] to [38], wherein the (meth)acrylate ester (co)polymer contains a monomer that generates a radical active species on receiving light.

[40] The use of a double-sided pressure-sensitive adhesive sheet for an adhering method of a flexible component member for constituting an image display device according to any one of the items [32] to [39], wherein the double-sided pressure-sensitive adhesive sheet has a storage elastic modulus G' at a frequency of 1 Hz and a temperature 50° C. in a range of $3.0 \times 10^2$ to $4.0 \times 10^4$ Pa.

[41] The use of a double-sided pressure-sensitive adhesive sheet for an adhering method of a flexible component member for constituting an image display device according to any one of the items [32] to [40], wherein the component member for constituting an image display device is a combination of two or more kinds in the group consisting of a surface protective panel, a touch-sensitive panel, an optical film, and an organic EL display panel.

[42] A method for adhering a flexible component member for constituting an image display device, including the use of a double-sided pressure-sensitive adhesive sheet according to any one of the items [32] to [41].

Advantageous Effects of Invention

The double-sided pressure-sensitive adhesive sheet of the present invention has excellent flexing resistance, and thus can be used as a pressure-sensitive adhesive material that is favorable for adhering a flexible component member for constituting an image display device capable of being flexed or curved.

The double-sided pressure-sensitive adhesive sheet of the present invention can be particularly favorably used as a double-sided pressure-sensitive adhesive sheet for an image display device having a flexible component member equipped with a substrate capable of being flexed or curved, such as an organic EL (electronic luminescent) display panel.

BRIEF DESCRIPTION OF DRAWING

FIG. 1 is an explanatory illustration showing the flexing test in Examples and Comparative Examples.

DESCRIPTION OF EMBODIMENTS

While embodiments of the present invention will be described below, the description is one example (representative example) of embodiments of the present invention, and the present invention is not limited to the contents thereof.

The term "(meth)acryl" has a meaning that encompasses acryl and methacryl, the term "(meth)acryloyl" has a meaning that encompasses acryloyl and methacryloyl, the term "(meth)acrylate" has a meaning that encompasses acrylate and methacrylate, and the term "(co)polymer" has a meaning that encompasses a polymer and a copolymer. The term "sheet" conceptually encompasses a sheet, a film, and a tape.

The "storage elastic modulus G'" means a storage elastic modulus that is obtained by measuring the dynamic viscoelasticity in a shear mode, and is a value that is obtained by the method described in the examples described later.

<<Double-Sided Pressure-Sensitive Adhesive Sheet>>

The double-sided pressure-sensitive adhesive sheet of the present invention (which may be hereinafter referred to as a "present double-sided pressure-sensitive adhesive sheet") has no substrate and has at least the following features (1) to (4).

The double-sided pressure-sensitive adhesive sheet having no substrate means a double-sided pressure-sensitive adhesive sheet that does not have a substrate functioning as a support but has only a pressure-sensitive adhesive layer.

(1) The present double-sided pressure-sensitive adhesive sheet is formed of a pressure-sensitive adhesive composition containing at least a (meth)acrylate ester (co)polymer (A).

(2) The present double-sided pressure-sensitive adhesive sheet has a thickness in a range of 10 μm or more and 150 μm or less.

(3) The present double-sided pressure-sensitive adhesive sheet has a glass transition temperature (Tg) defined by the Tan δ peak temperature of the dynamic viscoelasticity in a range of −50° C. to −20° C.

(4) The present double-sided pressure-sensitive adhesive sheet has a storage elastic modulus G' at a frequency of 1 Hz and a temperature 100° C. in a range of $2.0 \times 10^3$ to $3.0 \times 10^4$ Pa.

The features (1) to (4) will be described in detail.

The pressure-sensitive adhesive described in PTL 5 is set to have a glass transition temperature (Tg) of −70° C. or more and −55° C. or less, and thus is considered to have a poor practical adhesion force at room temperature and insufficient durability.

Under the circumstances, the present inventors have thoroughly investigated the mechanism of the formation of a flexure mark in a pressure-sensitive adhesive sheet for studying to provide a pressure-sensitive adhesive sheet having high flexing resistance without significant decrease of the glass transition temperature (Tg) of the pressure-sensitive adhesive as in PTL 5, and have clarified that the flexure mark formed in a pressure-sensitive adhesive sheet is caused mainly by two phenomena.

One of the two phenomena is "buckling", and the other one thereof is "flowing".

The "buckling" is a phenomenon in which the pressure-sensitive adhesive sheet suffers whitening or flexure mark around the flexure line as the center after the flexing test.

The "flowing" is a phenomenon in which the pressure-sensitive adhesive sheet seems to bulge around the flexure line after the flexing test.

As a result of the investigations continued to clarify the cause of the phenomena, it has been clarified that the "buckling" is a kind of a breakage and yield phenomenon of a polymer structure that occurs mainly by the reduced margin to the microscopic free movement of the molecular chains, which is caused by the high glass transition temperature and the high storage shear elastic modulus (G') of the pressure-sensitive adhesive.

It has also been clarified that the "flowing" is a phenomenon that occurs by the accumulation of extrusion due to flexure of the pressure-sensitive adhesive sheet held between the upper and lower films, which is caused by the low storage shear elastic modulus (G').

The present inventors have made accumulated investigations under the assumption that the two phenomena (buckling and flowing) can be controlled by adjusting the storage shear elastic modulus (G') of the pressure-sensitive adhesive sheet from the aforementioned results, and as a result have found that by controlling the storage shear elastic modulus in the particular temperature range, a pressure-sensitive adhesive sheet having flexing resistance can be obtained without significant decrease of the glass transition temperature of the pressure-sensitive adhesive as in PTL 5.

According to the results, the present double-sided pressure-sensitive adhesive sheet can be favorably used for adhering, for example, a plastic panel or a component member for constituting an image display device, such as an organic EL (electronic luminescent) display panel, and particularly for adhering a flexible component member for constituting an image display device capable of being flexed or curved in a flexible display having the component member for constituting an image display device.

The term "flexible" herein means capability of flexing or curving, and the capability of flexing or curving includes a flexed or curved state. Specifically, the curvature radius of the capability of flexing or curving is preferably 10 mm or less, and more preferably 3 mm or less. In particular, the application to a flexible component member with a curvature radius 3 mm or less may enable the use of a display in a folded state.

The component member for constituting an image display device may be a flexible component member capable of being flexed or curved, and examples thereof include a combination of two or more kinds in the group consisting of a surface protective panel, a touch-sensitive panel, an optical film, and an organic EL (electronic luminescent) display panel, each having a substrate formed of a resin film, glass, or the like capable of being flexed or curved.

Among these, at least one of the component members for constituting an image display device is preferably the flexible component member, and particularly preferably a flexible organic EL (electronic luminescent) display panel.

Examples of the surface protective panel include a flexible component member that is produced with such a material as a thin glass sheet or plastics, and protects from an external impact by standing on the outermost layer side, which may be referred to as a cover film. The surface protective panel may have a tough-sensitive panel function integrated therein, and may be a touch on lens (TOL) type of a one glass solution (OGS) type.

The surface protective panel may have a printed step portion that is printed in a frame form on the outer periphery portion thereof.

Examples of the touch-sensitive panel include a flexible component member that has a sensor function by mounting a touch sensor on such a substrate as a thin glass sheet or plastics.

The touch-sensitive panel encompasses an in-cell type image display panel having a touch-sensitive function built in an image display panel, and an on-cell type image display panel having a touch-sensitive function built between a polarizing plate and an organic EL panel.

Examples of the optical film include a flexible component member, such as a polarizing film, a phase retardation film, an optical filter, an antireflection film, a near infrared ray filter, and an electromagnetic wave shield film, that is mounted inside a flexible display and exerts an optical function.

Examples of the flexible organic EL display panel include a component member having a structure including a plastic substrate capable of being flexed or curved, having formed thereon various electrode layers or organic EL elements, on which a sealing film and a passivation film are laminated thereon.

Preferred examples of embodiments of the use of the double-sided pressure-sensitive adhesive sheet of the present invention include configurations of (organic EL display panel)/(present double-sided pressure-sensitive adhesive double-sided pressure-sensitive adhesive sheet)/(release film), (surface protective panel)/(present double-sided pressure-sensitive adhesive sheet)/(release film), and (optical film)/(present double-sided pressure-sensitive adhesive sheet)/(release film). Preferred examples of embodiments thereof also include configurations of (organic EL display panel)/(present double-sided pressure-sensitive adhesive sheet)/(touch-sensitive panel), (organic EL display panel)/(present double-sided pressure-sensitive adhesive sheet)/(surface protective panel), (organic EL display panel)/(present double-sided pressure-sensitive adhesive sheet)/(touch-sensitive panel)/(present double-sided pressure-sensitive adhesive sheet)/(surface protective panel), (optical film)/(present double-sided pressure-sensitive adhesive sheet)/(touch-sensitive panel), and (optical film)/(present double-sided pressure-sensitive adhesive sheet)/(touch-sensitive panel)/(present double-sided pressure-sensitive adhesive sheet)/(surface protective panel).

<Pressure-Sensitive Adhesive Composition>

The present double-sided pressure-sensitive adhesive sheet is formed of a pressure-sensitive adhesive composition (which may be hereinafter referred to as a "present pressure-sensitive adhesive composition") containing at least a (meth)acrylate ester (co)polymer (A).

The present pressure-sensitive adhesive composition may further contain a crosslinking agent (B), a photoinitiator (C), and other additional components, and is preferably a photocurable composition.

The present double-sided pressure-sensitive adhesive sheet may have either a single layer structure or a multilayer structure.

<(Meth)Acrylate Ester (Co)Polymer (A)>

Examples of the (meth)acrylate ester (co)polymer (A) include a homopolymer of an alkyl (meth)acrylate and a copolymer obtained through polymerization with a monomer component capable being copolymerized therewith.

In particular, it is preferred that the (meth)acrylate ester (co)polymer (A) contains two or more copolymerization components, and at least one of the copolymerization components is an alkyl (meth)acrylate and/or any of the following copolymerizable monomers A to H.

(1) Among the copolymerizable monomers A to H, the copolymerizable monomer A, B, or E is particularly preferred.

(2) It is particularly preferred that the copolymerizable monomer A is not contained, and any one or both of the copolymerizable monomers B and E are contained. In the case where anyone or both of the copolymerizable monomers B and E are contained, the corrosion resistance characteristics, the adhesiveness, and the hygrothermal whitening resistance characteristics can be achieved simultaneously.

The expression "the copolymerizable monomer A is not contained" means that "the copolymerizable monomer A is substantially not contained", and encompasses not only the case where the monomer is completely not contained, but also the case where the copolymerizable monomer A is contained in the (meth)acrylate ester (co)polymer in an amount of less than 0.5% by mass, and preferably less than 0.1% by mass.

(3) In the alkyl (meth)acrylate, an alkyl (meth)acrylate having a (meth)acryloyl group bonded to a tertiary carbon atom is preferred. The use of the alkyl (meth)acrylate of this type may facilitate the flattening of the storage shear elastic modulus (G') of the present double-sided pressure-sensitive adhesive sheet on the high temperature side (from 100° C. to 150° C.)

More specific examples of the (meth)acrylate ester (co)polymer (A) include a copolymer of an alkyl (meth)acrylate and a monomer component containing one or more monomers other than the alkyl (meth)acrylate that is capable of being copolymerized therewith selected from (a) a carboxy group-containing monomer (which may be hereinafter referred to as a "copolymerizable monomer A"), (b) a hydroxy group-containing monomer (which may be hereinafter referred to as a "copolymerizable monomer B"), (c) an amino group-containing monomer (which may be hereinafter referred to as a "copolymerizable monomer C"), (d) an epoxy group-containing monomer (which may be hereinafter referred to as a "copolymerizable monomer D"), (e) an amide group-containing monomer (which may be hereinafter referred to as a "copolymerizable monomer E"), (f) a vinyl monomer (which may be hereinafter referred to as a "copolymerizable monomer F"), (g) a (meth)acrylate monomer having a side chain having 1 to 3 carbon atoms (which may be hereinafter referred to as a "copolymerizable monomer G"), and (h) a macromonomer ((which may be hereinafter referred to as a "copolymerizable monomer H").

The alkyl (meth)acrylate is preferably a linear or branched alkyl (meth)acrylate having a side chain having 4 to 18 carbon atoms, and examples of the linear or branched alkyl (meth)acrylate having a side chain having 4 to 18 carbon atoms include n-butyl (meth)acrylate, isobutyl (meth)acrylate, sec-butyl (meth)acrylate, t-butyl (meth)acrylate, pentyl (meth)acrylate, isopentyl (meth)acrylate, neopentyl (meth)acrylate, hexyl (meth)acrylate, cyclohexyl (meth)acrylate, heptyl (meth)acrylate, 2-ethylhexyl (meth)acrylate, n-octyl (meth)acrylate, isooctyl (meth)acrylate, nonyl (meth)acrylate, isononyl (meth)acrylate, t-butylcyclohexyl (meth)acrylate, decyl (meth)acrylate, isodecyl (meth)acrylate, undecyl (meth)acrylate, lauryl (meth)acrylate, tridecyl (meth)acrylate, tetradecyl (meth)acrylate, cetyl (meth)acrylate, stearyl (meth)acrylate, isostearyl (meth)acrylate, isobornyl (meth)acrylate, 3,5,5-trimethylcyclohexyl (meth)acrylate, dicyclopentanyl (meth)acrylate, dicyclopentenyl (meth)acrylate, and dicyclopentenyloxyethyl (meth)acrylate. These compounds may be used solely or as a combination of two or more kinds thereof.

Examples of the copolymerizable monomer A include (meth)acrylic acid, 2-(meth)acryloyloxyethylhexahydrophthalic acid, 2-(meth)acryloyloxypropylhexahydrophthalic acid, 2-(meth)acryloyloxyethylphthalic acid, 2-(meth)acryloyloxypropylphthalic acid, 2-(meth)acryloyloxyethylmaleic acid, 2-(meth)acryloyloxypropylmaleic acid, 2-(meth)acryloyloxyethylsuccinic acid, 2-(meth)acryloyloxypropylsuccinic acid, crotonic acid, fumaric acid, maleic acid, and itaconic acid. These compounds may be used solely or as a combination of two or more kinds thereof.

Examples of the copolymerizable monomer B include a hydroxyalkyl (meth)acrylate compound, such as 2-hydroxyethyl (meth)acrylate, 2-hydroxypropyl (meth)acrylate, 3-hydroxypropyl (meth)acrylate, and 2-hydroxybutyl (meth)acrylate. These compounds may be used solely or as a combination of two or more kinds thereof.

Examples of the copolymerizable monomer C include an aminoalkyl (meth)acrylate, such as aminomethyl (meth)acrylate, aminoethyl (meth)acrylate, aminopropyl (meth)acrylate, and aminoisopropyl (meth)acrylate, an N-alkylaminoalkyl (meth)acrylate, and an N,N-dialkylaminoalkyl (meth)acrylate, such as N,N-dimethylaminoethyl (meth)acrylate and N,N-dimethylaminopropyl (meth)acrylate. These compounds may be used solely or as a combination of two or more kinds thereof.

Examples of the copolymerizable monomer D include glycidyl (meth)acrylate, methylglycidyl (meth)acrylate, 3,4-epoxycyclohexyl (meth)acrylate, and 4-hydroxybutyl (meth)acrylate glycidyl ether. These compounds may be used solely or as a combination of two or more kinds thereof.

Examples of the copolymerizable monomer E include (meth)acrylamide, N,N-dimethyl(meth)acrylamide, N-butyl (meth)acrylamide, N-methylol(meth)acrylamide, N-methylolpropane(meth)acrylamide, N-methoxymethyl(meth)acrylamide, N-butoxymethyl(meth)acrylamide, diacetone(meth)acrylamide, maleic acid amide, and maleimide. These compounds may be used solely or as a combination of two or more kinds thereof.

Examples of the copolymerizable monomer F include a compound having a vinyl group in the molecule thereof. Examples of the compound include an alkyl (meth)acrylate having an alkyl group having 1 to 12 carbon atoms, a functional monomer having a functional group, such as a hydroxy group, an amide group, and an alkoxyalkyl group, a polyalkylene glycol di(meth)acrylate, a vinyl ester monomer, such as vinyl acetate, vinyl propionate, and vinyl laurate, and an aromatic vinyl monomer, such as styrene, chlorostyrene, chloromethylstyrene, α-methylstyrene, and other substituted styrene compound.

These compounds may be used solely or as a combination of two or more kinds thereof.

Examples of the copolymerizable monomer G include methyl (meth)acrylate, ethyl (meth)acrylate, n-propyl (meth)acrylate, and isopropyl (meth)acrylate. These compounds may be used solely or as a combination of two or more kinds thereof.

The copolymerizable monomer H is a monomer that provides a number of carbon atoms of the side chain of 20 or more after forming the (meth)acrylate (co)polymer through polymerization. The use of the copolymerizable monomer H can provide a graft copolymer as the (meth)acrylate (co)polymer.

Accordingly, the characteristics of the main chain and the side chain of the graft copolymer can be changed by the selection and the mixing ratio of the copolymerizable monomer H and the other monomers.

The copolymerizable monomer H preferably has a skeleton component that is constituted by an acrylic polymer or a vinyl polymer. Examples of the skeleton component of the macromonomer include the examples exemplified for the aforementioned linear or branched alkyl (meth)acrylate having a side chain having 4 to 18 carbon atoms, the aforementioned copolymerizable monomer A, the copolymerizable monomer G described above, the aforementioned copolymerizable monomer B, and the like, and these compounds may be used solely or as a combination of two or more kinds thereof.

The macromonomer has a radical polymerizable group or a functional group, such as a hydroxy group, an isocyanate group, an epoxy group, a carboxy group, an amino group, an amide group, and a thiol group. The macromonomer preferably has a radical polymerizable group capable of being copolymerized with the other monomers. One or two or more radical polymerizable groups may be contained, and a compound containing one radical polymerizable group is particularly preferred. In the case where the macromonomer contains the functional group, one or two or more functional groups may be contained, and a compound containing one functional group is particularly preferred.

Any one or both of the radical polymerizable group and the functional group may be contained.

The copolymerizable monomer H preferably has a number average molecular weight of 500 to 20,000, particularly 800 or more or 8,000 or less is preferred, and further particularly 1,000 or more or 7,000 or less is more preferred.

The macromonomer used may be a commonly produced product (such as a macromonomer, produced by Toagosei Co., Ltd.).

The (meth)acrylate ester (co)polymer (A) that is obtained by combining the aforementioned monomers to provide a glass transition temperature (Tg) of the double-sided pressure-sensitive adhesive sheet in a range of −50° C. to −20° C. may be used.

From the standpoint of the control of Tg and the storage elastic modulus, the (meth)acrylate ester (co)polymer (A) is preferably (1) a copolymer of the linear or branched alkyl (meth)acrylate having a side chain having 4 to 18 carbon atoms and a monomer component containing the copolymerizable monomer A and/or the copolymerizable monomer B. In particular, (2) a copolymer of the linear or branched alkyl (meth)acrylate having a side chain having 4 to 18 carbon atoms and a monomer component containing the copolymerizable monomer A is preferred.

In the case where the (meth)acrylate ester (co)polymer (A) contains the copolymerizable monomer A, Tg can be kept low to broaden the range of selection of the copolymerizable monomer B, and thus the flexing resistance and the hygrothermal whitening resistance can be readily balanced with the basic pressure-sensitive adhesive capability including the adhesion force and the durability.

From the standpoint of the corrosion resistance, the hygrothermal whitening resistance, and the flatness of the storage shear elastic modulus (G') on the high temperature side of the present double-sided pressure-sensitive adhesive sheet, the (meth)acrylate ester (co)polymer (A) is preferably a copolymer of the linear or branched alkyl (meth)acrylate having a side chain having 4 to 18 carbon atoms and a monomer component containing the copolymerizable monomer B and/or the copolymerizable monomer E with no copolymerizable monomer A contained.

The linear or branched alkyl (meth)acrylate having a side chain having 4 to 18 carbon atoms used is preferably an alkyl (meth)acrylate having a (meth)acryloyl group bonded to a tertiary carbon atom.

Examples of the alkyl (meth)acrylate having a (meth)acryloyl group bonded to a tertiary carbon atom include 2-ethylhexyl (meth)acrylate, isooctyl (meth)acrylate, isononyl (meth)acrylate, isodecyl (meth)acrylate, isobutyl (meth)acrylate, and isostearyl (meth)acrylate. These compounds may be used solely or as a combination of two or more kinds thereof.

The linear or branched alkyl (meth)acrylate having a side chain having 4 to 18 carbon atoms is preferably contained in an amount of 30% by mass or more and 90% by mass or more, more preferably contained in an amount of 35% by mass or more or 88% by mass or less, and further preferably in an amount of 40% by mass or more or 85% by mass or less, in the total monomer components of the copolymer.

The copolymerizable monomer A is preferably contained in an amount of 1.2% by mass to 15% by mass, and from the standpoint of excellent pressure-sensitive adhesion properties, more preferably contained in an amount of 1.5% by mass or more and 10% by mass or less, and particularly preferably 2% by mass or more or 8% by mass or less, in the total monomer components of the copolymer.

The copolymerizable monomer B is preferably contained in an amount of 0% by mass or more and 30% by mass or less, and more preferably contained in an amount of 0% by mass or more and 25% by mass or less, and particularly preferably 1% by mass or more or 20% by mass or less, in the total monomer components of the copolymer.

The copolymerizable monomer C is preferably contained in an amount of 0% by mass or more and 30% by mass or less, and more preferably contained in an amount of 0% by mass or more and 25% by mass or less, and particularly preferably 0% by mass or more or 20% by mass or less, in the total monomer components of the copolymer.

The copolymerizable monomer D is preferably contained in an amount of 0% by mass or more and 30% by mass or less, and more preferably contained in an amount of 0% by mass or more and 25% by mass or less, and particularly preferably 0% by mass or more or 20% by mass or less, in the total monomer components of the copolymer.

The copolymerizable monomer E is preferably contained in an amount of 0% by mass or more and 30% by mass or less, and more preferably contained in an amount of 0% by mass or more and 25% by mass or less, and particularly preferably 1% by mass or more or 20% by mass or less, in the total monomer components of the copolymer.

The copolymerizable monomer F is preferably contained in an amount of 0% by mass or more and 30% by mass or less, and more preferably contained in an amount of 0% by mass or more and 25% by mass or less, and particularly preferably 0% by mass or more or 20% by mass or less, in the total monomer components of the copolymer.

The copolymerizable monomer G is preferably contained in an amount of 0% by mass or more and 70% by mass or less, and more preferably contained in an amount of 3% by mass or more and 65% by mass or less, and particularly preferably 5% by mass or more or 60% by mass or less, in the total monomer components of the copolymer.

The copolymerizable monomer H is preferably contained in an amount of 5% by mass or more and 30% by mass or less, and more preferably contained in an amount of 6% by mass or more and 25% by mass or less, and particularly preferably 8% by mass or more or 20% by mass or less, in the total monomer components of the copolymer.

In addition to the compounds described above, an acid anhydride group-containing monomer, such as maleic anhydride and itaconic anhydride, a heterocyclic basic monomer, such as vinylpyrrolidone, vinylpyridine, and vinylcarbazole, and the like may be appropriately used depending on necessity.

The (meth)acrylate ester (co)polymer (A) preferably has a mass average molecular weight of 100,000 to 1,500,000, more preferably 150,000 or more or 1,300,000 or less, and particularly preferably 200,000 or more or 1,200,000 or less.

The present pressure-sensitive adhesive composition is preferably a solventless system containing no solvent. The present pressure-sensitive adhesive composition that is a solventless system may have advantages including excellent high temperature durability due to no solvent remaining.

In the case where the present pressure-sensitive adhesive composition is a solventless system and is formed into a film by a hot-melt method, the mass average molecular weight of the (meth)acrylate ester (co)polymer (A) is preferably 100,000 to 900,000, more preferably 150,000 or more or 750,000 or less, and most preferably 200,000 or more or 600,000 or less.

The (meth)acrylate ester (co)polymer (A) having a mass average molecular weight in the aforementioned range can be subjected to hot-melt film formation.

From the aforementioned standpoint, the mass average molecular weight of the (meth)acrylate ester (co)polymer (A) is particularly preferably 150,000 to 750,000, and most preferably 200,000 or more or 600,000 or less.

Most preferred examples of the (meth)acrylic ester (co)polymer (A) include a (meth)acrylate ester copolymer obtained through copolymerization of two or more kinds of monomer components selected from a monomer component (a), such as 2-ethylhexyl (meth)acrylate, isooctyl (meth)acrylate, isononyl (meth)acrylate, isodecyl (meth)acrylate, isobutyl (meth)acrylate, and isostearyl (meth)acrylate, a monomer component (b), such as (meth)acrylic acid having a carboxy group, 2-(meth)acryloyloxyethylhexahydrophthalic acid, 2-(meth)acryloyloxypropylhexahydrophthalic acid, 2-(meth)acryloyloxyethylphthalic acid, 2-(meth)acryloyloxypropylphthalic acid, 2-(meth)acryloyloxyethylmaleic acid, 2-(meth)acryloyloxypropylmaleic acid, 2-(meth)acryloyloxyethylsuccinic acid, 2-(meth)acryloyloxypropylsuccinic acid, crotonic acid, fumaric acid, maleic acid, and itaconic acid, and a monomer component (c) having an organic functional group, such as a hydroxyalkyl (meth)acrylate, e.g., 2-hydroxyethyl (meth)acrylate, 2-hydroxypropyl (meth)acrylate, 3-hydroxypropyl (meth)acrylate, and 2-hydroxybutyl (meth)acrylate, (meth)acrylamide, N,N-dimethyl(meth)acrylamide, N-butyl(meth)acrylamide, N-methylol(meth)acrylamide, N-methylolpropane (meth)acrylamide, N-methoxymethyl(meth)acrylamide, N-butoxymethyl(meth)acrylamide, diacetone(meth)acrylamide, maleic acid amide, and maleimide.

Among these, a (meth)acrylate ester copolymer obtained through copolymerization of one or more kinds selected from each of the monomer components (a) and (b) is preferred, and a (meth)acrylate ester copolymer obtained through copolymerization of one or more kinds selected from each of the monomer components (a), (b), and (c) is more preferred.

From the standpoint of the corrosion resistance, the hygrothermal whitening resistance, and the flatness of the storage shear elastic modulus (G') on the high temperature side of the present double-sided pressure-sensitive adhesive sheet, a (meth)acrylate ester copolymer obtained through copolymerization of one or more kinds selected from each of the monomer components (a) and (c) is more preferred.

(Crosslinking Agent (B))

The present pressure-sensitive adhesive composition preferably contains a crosslinking agent (B) in addition to the (meth)acrylate ester (co)polymer (A).

The crosslinking agent (B) contained may facilitate the control of the storage elastic modulus G' of the (meth)acrylate ester (co)polymer (A).

The crosslinking agent (B) is preferably a crosslinking agent having at least a double bond crosslinking. Examples thereof include a crosslinking agent having at least one kind of a crosslinkable functional group selected from a (meth)acryloyl group, an epoxy group, an isocyanate group, a carboxy group, a hydroxy group, a carbodiimide group, an oxazoline group, an aziridine group, a vinyl group, an amino group, an imino group, and an amide group, which may be used solely or as a combination of two or more kinds thereof. An embodiment in which the crosslinking agent (B) is chemically bonded to the (meth)acrylate ester copolymer (A) is also encompassed.

Among these, a polyfunctional (meth)acrylate is preferably used. The polyfunctionality herein means two or more crosslinkable functional groups contained. Three or more or four or more crosslinkable functional groups may be contained depending on necessity.

The crosslinkable functional group may be protected with a protective group that is capable of being deprotected.

Examples of the polyfunctional (meth)acrylate include an ultraviolet ray-curable polyfunctional (meth)acrylate monomer, such as 1,4-butanediol di(meth)acrylate, glycerin di(meth)acrylate, neopentyl glycol di(meth)acrylate, glycerin diglycidyl ether di(meth)acrylate, 1,6-hexanediol di(meth)acrylate, 1,9-nonanediol di(meth)acrylate, tricyclodecane di(meth)acrylate, tricyclodecanedimethanol di(meth)acrylate, bisphenol A polyethoxy di(meth)acrylate, bisphenol A polypropoxy di(meth)acrylate, bisphenol F polyethoxy di(meth)acrylate, ethylene glycol di(meth)acrylate, trimethylolpropane trioxyethyl(meth)acrylate, ε-caprolactone-modified tris(2-hydroxyethyl) isocyanurate tri(meth)acrylate, pentaerythritol tri(meth)acrylate, propoxylated pentaerythritol tri(meth)acrylate, ethoxylated pentaerythritol tri(meth)acrylate, pentaerythritol tetra(meth)acrylate, propoxylated dipentaerythritol tetra(meth)acrylate, ethoxylated pentaerythritol tetra(meth)acrylate, dipentaerythritol hexa(meth)acrylate, polyethylene glycol di(meth)acrylate, tris(acryloxyethyl) isocyanurate, pentaerythritol tetra(meth)acrylate, dipentaerythritol hexa(meth)acrylate, dipentaerythritol penta(meth)acrylate, tripentaerythritol hexa(meth)acrylate, tripentaerythritol penta(meth)acrylate, hydroxypivalic acid neopentyl glycol di(meth)acrylate, di(meth)acrylate of ε-caprolactone adduct of hydroxypivalic acid neopentyl glycol, trimethylolpropane tri(meth)acrylate, trimethylolpropane (meth)acrylate, and ditrimethylolpropane tetra(meth)acrylate, and a polyfunctional (meth)acryl oligomer, such as polyester (meth)acrylate, epoxy (meth)acrylate, urethane (meth)acrylate, and polyether (meth)acrylate. These compounds may be used solely or as a combination of two or more kinds thereof.

The content of the crosslinking agent (B) is preferably 0.5 to 50 parts by mass, more preferably 1 part by mass or more or 40 parts by mass or less, and particularly preferably 5 parts by mass or more or 30 parts by mass or less, per 100 parts by mass of the (meth)acrylate ester (co)polymer (A).

The crosslinking agent (B) contained in the aforementioned range of amount may facilitate the balance of the shape stability and the like of the present double-sided pressure-sensitive adhesive sheet.

(Photoinitiator (C))

The present pressure-sensitive adhesive composition preferably contains a photoinitiator (C) in addition to the crosslinking agent (B) and the (meth)acrylate ester (co)polymer (A).

The photoinitiator (C) exerts the function as a reaction initiating aid of the crosslinking reaction of the crosslinking agent (B). The photoinitiator (C) is preferably a photoinitiator that is sensitive to an ultraviolet ray having a wavelength of 380 nm or less from the standpoint of the easiness in controlling the crosslinking reaction.

A photoinitiator that is sensitive to light having a wavelength of 380 nm or longer wavelength is preferred since high photoreactivity may be obtained, and in the case where the present pressure-sensitive adhesive composition is formed into a sheet, the light, to which the photoinitiator is sensitive, can reach the deep portion of the sheet.

The photoinitiator can be roughly classified into two in terms of radical generation mechanism, and can be broadly divided into a cleavage type photoinitiator, in which a radical can be generated through the cleavage decomposition of the single bond of the photoinitiator itself, and a hydrogen abstraction type photoinitiator, in which the photoexcited initiator and a hydrogen donor in the system form an excited complex, and hydrogen of the hydrogen donor can be transferred.

Among these, the cleavage type photoinitiator becomes other compounds through decomposition at the time of forming a radical by light irradiation, and loses the function as an initiator after the photoinitiator is once excited. Accordingly, the cleavage type photoinitiator is preferred since an active species does not remain in the pressure-sensitive adhesive after completing the crosslinking reaction, avoiding the possibility of unexpected photodeterioration and the like of the pressure-sensitive adhesive.

The hydrogen abstraction type photoinitiator does not form a decomposition product as in the case of the cleavage type photoinitiator at the time of forming a radical by irradiation with an active energy ray, such as an ultraviolet ray, and therefore is useful since a volatile component is hard to be formed therefrom after completing the reaction, resulting in decrease of the damage to the adherend.

In the present invention, the hydrogen abstraction type photoinitiator is particularly preferably used as the photoinitiator (C). The use of the hydrogen abstraction type photoinitiator causes crosslinking reaction between molecules of the (meth)acrylate ester (co)polymer (A), and can facilitate the flattening of the storage shear elastic modulus (G') of the double-sided pressure-sensitive adhesive sheet on the high temperature side. In particular, in the case where the (meth)acrylate ester (co)polymer (A) having a mass average molecular weight in a relatively low range of 100,000 to 900,000 is used, the use of the hydrogen abstraction type photoinitiator can facilitate the flattening of the storage shear elastic modulus (G') of the double-sided pressure-sensitive adhesive sheet on the high temperature side.

Furthermore, due to the similar reason as above, a monomer that generates a radical active species on receiving light is preferably used as a (co)polymerization component constituting the (meth)acrylate ester (co)polymer (A). Examples of the monomer of this type include a compound that has a benzophenone structure, a benzyl structure, an o-benzoyl benzoate structure, a thioxanthone structure, a 3-ketocoumarin structure, a 2-ethylanthraquinone structure, or a camphorquinone structure, and can abstract hydrogen from the molecule of the (meth)acrylate ester (co)polymer (A).

More specifically, examples thereof include an acrylic monomer having a benzophenone structure, such as 4-acryloyloxybenzophenone, 4-acryloyloxyethoxybenzophenone, 4-acryloyoloxy-4'-methoxybenzophenone, 4-acryloyloxyethoxy-4'-methoxybenzophenone, 4-acryloyloxy-4'-bromobenzophenone, 4-acryloyloxyethoxy-4'-bromobenzophenone, 4-methacryloyloxybenzophenone, 4-methacryloyloxyethoxybenzophenone, 4-methacryloyloxy-4'-methoxybenzophenone, 4-methacryloyloxyethoxy-4'-methoxybenzophenone, 4-methacryloyloxy-4'-bromobenzophenone, 4-methacryloyloxyethoxy-4'-bromobenzophenone, and mixtures thereof.

Examples of the cleavage type photoinitiator include 2,2-dimethoxy-1,2-diphenylethan-1-one, 1-hydroxycyclohexyl phenyl ketone, 2-hydroxy-2-methyl-1-phenylpropan-1-one, 1-(4-(2-hydroxyethoxy)phenyl)-2-hydroxy-2-methyl-1-propan-1-one, 2-hydroxy-1-[4-{4-(2-hydroxy-2-methylpropionyl)benzyl}phenyl]-2-methylpropan-1-one, oligo(2-hydroxy-2-methyl-1-(4-(1-methylvinyl)phenyl)propanone), methyl phenylglyoxylate, 2-benzyl-2-dimethylamino-1-(4-morpholinophenyl)butan-1-one, 2-(4-methylbenyl)-2-dimethylamino-1-(4-morpholinophenyl)butan-1-one, 2-methyl-1-[4-(methylthio)phenyl]-2-morpholinopropan-1-one, 2-(dimethylamino)-2-[(4-methylphenyl)methyl]-1-[4-(4-morpholin yl)phenyl]-1-butanone, 1,2-octandione,1-(4-(phenylthio)-,2-(o-benzoyloxime)), 1-[9-ethyl-6-(2-methylbenzoyl)-9H-carbazol-3-yl]ethanone 1-(O-acetyloxime), bis(2,4,6-trimethylbenzoyl)phenylphosphine oxide, 2,4,6-trimethylbenzoyldiphenylphosphine oxide, (2,4,6-trimethylbenzoyl)ethoxyphenylphosphine oxide, bis (2,6-dimethoxybenzoyl)-2,4,4-trimethylpentylphosphine oxide, and derivatives thereof.

Examples of the hydrogen abstraction type photoinitiator include benzophenone, 4-methylbenzophenone, 2,4,6-trimethylbenzophenone, 4-phenylbenzophenone, 3,3'-dimethyl-4-methoxybenzophenone, 4-(meth)acryloyloxybenzophenone, 4-[2-((meth)acryloyloxy)ethoxy]benzophenone, 4-(meth)acryloyloxy-4'-methoxybenzophenone, methyl 2-benzoylbenzoate, methyl benzoylformate, bis(2-phenyl-2-oxoacetic acid)oxybisethylene, 4-(1,3-acryloyl-1,4,7,10,13-pentaoxotridecyl)benzophenone, thioxanthone, 2-chlorothioxanthone, 3-methylthioxanthone, 2,4-dimethylthioxanthone, anthraquinone, 2-methylanthraquinone, 2-ethylanthraquinone, 2-tert-butylanthraquinone, 2-aminoanthraquinone, camphorquinone, and derivatives thereof. The photoinitiator (C) is not limited to the substances exemplified above. One kind of the aforementioned photoinitiators (C) or a derivative thereof may be used, and two or more kinds thereof may be used in combination.

Among these, an acylphosphine oxide photoinitiator, such as bis(2,4,6-trimethylbenzoyl)phenylphosphine oxide, 2,4, 6-trimethylbenzoyldiphenylphosphine oxide, (2,4,6-trimethylbenzoyl)ethoxyphenylphosphine oxide, and bis(2,6-dimethoxybenzoyl)-2,4,4-trimethylpentylphosphine oxide, is preferred since the photoinitiator has high sensitivity to light and is decolored in the form of the decomposition product after the reaction.

The photoinitiator (C) used is preferably benzophenone, 4-methylbenzophenone, 2,4,6-trimethylbenzophenone, 4-phenylbenzophenone, 3,3'-dimethyl-4-methoxybenzophenone, 4-(meth)acryloyloxybenzophenone, 4-[2-((meth)acryloyloxy)ethoxy]benzophenone, 4-(meth)acryloyloxy-4'-methoxybenzophenone, methyl 2-benzoylbenzoate, methyl benzoylformate, or the like from the standpoint of the easiness in controlling the reaction.

The content of the photoinitiator (C) is not particularly limited. As rough estimation, the content thereof is preferably 0.1 to 10 parts by mass, and particularly 0.5 part by mass or more or 5 parts by mass or less, and further particularly 1 part by mass or more or 3 parts by mass or less, per 100 parts by mass of the (meth)acrylate ester (co)polymer (A). In the case where the content of the photoinitiator (C) is in the range, suitable reaction sensitivity to an active energy ray can be obtained.

A sensitizer may also be used in addition to the photoinitiator (C). The sensitizer is not particularly limited, and sensitizers that have been used with a photoinitiator can be properly used. Examples thereof include an aromatic amine, an anthracene derivative, an anthraquinone derivative, a coumarin derivative, a thioxanthone derivative, a phthalocyanine derivative, and an aromatic ketone, such as benzophenone, xanthone, thioxanthone, Michler's ketone, and 9,10-phenanthraquinone, and derivatives thereof.

(Additional Components)

The present pressure-sensitive adhesive composition may contain known components having been mixed in an ordinary pressure-sensitive adhesive composition, in addition to the (meth)acrylate ester (co)polymer (A), the crosslinking agent (B), and the photoinitiator (C). For example, various additives, such as a tackifier resin, an antioxidant, a photostabilizer, a metal deactivator, a rust inhibitor, an anti-aging agent, a moisture absorbent, a hydrolysis inhibitor, an antistatic agent, an anti-foaming agent, and inorganic particles, may be appropriately contained. The present pressure-sensitive adhesive composition preferably contains a rust inhibitor among these, and specifically a rust inhibitor selected from the group consisting of benzotriazole, imidazole, triazole, tetrazole, thiazole, and derivatives thereof is preferably used.

A reaction catalyst (such as a tertiary amine compound, a quaternary ammonium compound, and a tin laurate compound) may also be appropriately used depending on necessity.

<Glass Transition Temperature (Tg)>

The present double-sided pressure-sensitive adhesive sheet has a glass transition temperature (Tg) in a range of −50° C. to −20° C.

In the case where the present double-sided pressure-sensitive adhesive sheet has a multilayer structure, it is not necessary that all the pressure-sensitive adhesive layers have glass transition temperatures (Tg) in the aforementioned range, but it suffices that the glass transition temperature of the entire pressure-sensitive adhesive layer constituted by the plural pressure-sensitive adhesive layers, i.e., the present double-sided pressure-sensitive adhesive sheet, is in the aforementioned range.

It has been considered that the flexing durability cannot be retained if the glass transition temperature exceeds −55° C. as described in PTL 5.

However, the present inventors have found that the flexing durability is not simply determined only by the value of the glass transition temperature, but the relationship to the storage elastic modulus G' described later is important, and also found that with the double-sided pressure-sensitive adhesive sheet having a storage elastic modulus G' within the range described later, not only the flexing durability can be obtained, but also excellent workability can be exhibited, by setting the glass transition temperature to a relatively high value.

From this standpoint, the glass transition temperature (Tg) of the pressure-sensitive adhesive layer is preferably −50° C. to −20° C., and most preferably −30° C. to −25° C.

For controlling the glass transition temperature (Tg) to the aforementioned range, the (meth)acrylate ester (co)polymer (A) that is constituted by the monomer component containing monomers selected from the aforementioned monomers may be used.

<Storage Elastic Modulus G'>

The present double-sided pressure-sensitive adhesive sheet has a storage elastic modulus G' at a frequency of 1 Hz and a temperature 100° C. in a range of $2.0 \times 10^3$ to $3.0 \times 10^4$ Pa.

It has been said that the flexing durability can be enhanced by setting the storage elastic modulus G' at a low temperature (−20° C.) to a relatively low value and setting the storage elastic modulus G' at a high temperature (85° C.) to a relatively high value as described in PTL 5, but the present inventors have found that in the careful observation of the state of the double-sided pressure-sensitive adhesive sheet after the flexing test by utilizing the projection test described later, a flexure mark is observed by the design of a double-sided pressure-sensitive adhesive sheet that has the aforementioned viscoelastic characteristics.

It has also found that not only the flexing durability can be enhanced, but also excellent workability can be exhibited, by the design of a double-sided pressure-sensitive adhesive sheet that has viscoelastic characteristics within the particular range, but not by the related art setting the storage elastic modulus G' at a low temperature (−20° C.) to a relatively low value and setting the storage elastic modulus G' at a high temperature (85° C.) to a relatively high value.

This can be explained by the temperature-time conversion law of a polymer material.

Specifically, for achieving flexing durability by the present double-sided pressure-sensitive adhesive sheet, it is necessary to provide durability against a repeated flexing test in a level of several tens of thousands of times, i.e., against repeated operations.

For achieving the durability against repeated operations by a polymer material, the viscoelastic behavior of the polymer material at a longer time side, which is the viscoelastic behavior of the polymer material at a high temperature side according to the temperature-time conversion law, is involved therein.

The present inventors have accumulated investigations focusing on the viscoelastic behavior of the present pressure-sensitive adhesive sheet on a high temperature side, and thus have found that the viscoelastic behavior in a region of a temperature of 100° C. largely contributes to the flexing durability.

From this standpoint, the present double-sided pressure-sensitive adhesive sheet preferably has a storage elastic modulus G' at a frequency of 1 Hz and a temperature 100° C. in a range of $3.0 \times 10^3$ to $2.0 \times 10^4$ Pa, and most preferably $4 \times 10^3$ to $1.0 \times 10^4$ Pa.

The present double-sided pressure-sensitive adhesive sheet preferably has a storage elastic modulus G' at a frequency of 1 Hz and a temperature 50° C. in a range of $3 \times 10^2$ to $4 \times 10^4$ Pa.

The flexing durability can be enhanced in a wide temperature range by the storage elastic modulus G' at a temperature 50° C. within the range, in addition to the storage elastic modulus G' at a temperature 100° C. within the aforementioned range.

From this standpoint, the storage elastic modulus G' at a frequency of 1 Hz and a temperature 50° C. is more preferably $5.0 \times 10^2$ to $3.0 \times 10^4$ Pa, and most preferably $1.0 \times 10^3$ to $1.0 \times 10^4$ Pa.

Furthermore, the present double-sided pressure-sensitive adhesive sheet preferably has a storage elastic modulus G' at a frequency of 1 Hz and a temperature −20° C. exceeding $1.5 \times 10^5$ Pa, more preferably $1.6 \times 10^5$ to $1.0 \times 10^7$ Pa, further preferably $3.0 \times 10^5$ to $5.0 \times 10^6$ Pa, and most preferably $4.3 \times 10^5$ to $1.0 \times 10^6$ Pa.

In the case where the storage elastic modulus (G') at a temperature of −20° C. (low temperature) is in the range, the flexing resistance can be readily imparted without impairing the pressure-sensitive adhesiveness and the tacking property at room temperature, resulting in advantages including the enhancement of the adhesion force, the durability, and the handleability in processing and adhering.

For controlling the storage elastic modulus G' to the aforementioned range, the (co)polymer (A) constituted by the monomer component containing the aforementioned monomers may be used as the constitutional component of the double-sided pressure-sensitive adhesive sheet, and it is most preferred that the crosslinking agent (B) and/or the photoinitiator (C) are contained.

The storage elastic modulus G' can also be controlled to the range by controlling the irradiation amount of an ultraviolet ray to the double-sided pressure-sensitive adhesive sheet. At this time, the irradiation amount of an ultraviolet ray is preferably 5,000 mJ/cm² or less, more preferably 4,000 mJ/cm² or less, further preferably 3,000 mJ/cm² or less, and most preferably 2,000 mJ/cm² or less.

Due to the same factors, the irradiation amount of an ultraviolet ray is preferably 250 mJ/cm² or more, more preferably 500 mJ/cm² or more, and most preferably 1,000 mJ/cm² or more.

In addition to the above, when an exponential curve is drawn to pass through two points of the storage elastic modulus G' (100) at a frequency of 1 Hz and a temperature of 100° C. and the storage elastic modulus G'(150) at a frequency of 1 Hz and a temperature of 150° C. in a storage elastic modulus-temperature graph plotting the temperature as the abscissa axis and the logarithm of the storage shear elastic modulus (G') as the ordinate axis for the double-sided pressure-sensitive adhesive sheet, the double-sided pressure-sensitive adhesive sheet preferably has a natural logarithm of the base of the exponential curve of −0.010 or more.

The above feature will be described in detail.

A flexible display necessarily has resistance to various flexing speeds under the actual use environment.

In a flexing test, it is estimated that the angular velocity of flexing the double-sided pressure-sensitive adhesive sheet continuously changes from the start of flexing to the end of flexing due to the structure of the flexing tester, the deflection of the film laminate.

As described above, in the flexing test, the double-sided pressure-sensitive adhesive sheet is deformed at various speeds. Accordingly, in particular, the double-sided pressure-sensitive adhesive sheet used in the flexible display is demanded to avoid the "buckling" and "flowing" described above in various possible speed regions.

Rephrasing this using the temperature-time conversion law, it can be said that the pressure-sensitive adhesive used in the flexible display is demanded to have stable viscoelastic behavior in various temperature regions.

The present inventors have found as described above that a high flexing resistance can be provided for the double-sided pressure-sensitive adhesive sheet by controlling the storage shear elastic modulus (G') on the high temperature side (temperature of 100° C.) to the particular range, and have further found as an advancement therefrom that a high flexing resistance can be provided even under condition closer to the actual use environment by flattening the viscoelastic curve of 100° C. to 150° C.

Accordingly, that fact that in the case where an exponential curve is drawn to pass through two points of the storage elastic modulus G'(100) at a frequency of 1 Hz and a temperature of 100° C. and the storage elastic modulus G' (150) at a frequency of 1 Hz and a temperature of 150° C., the natural logarithm of the base of the exponential curve is −0.010 or more means that the viscoelastic behavior at a temperature of 100° C. to 150° C. is nearly flat.

Therefore, from this standpoint, the natural logarithm is preferably close to 0.00 as much as possible, and is preferably −0.010 or more and 0.010 or less, more preferably −0.007 or more and 0.007 or less, and most preferably −0.003 or more and 0.003 or less.

<Thickness of Double-sided Pressure-sensitive Adhesive Sheet>

The present double-sided pressure-sensitive adhesive sheet has a thickness of 10 μm or more and 150 μm or less.

In general, the compression stress of a double-sided pressure-sensitive adhesive sheet in flexing is increased in proportion to the square of the thickness thereof, and therefore the occurrence of a flexure mark in the flexing test can be suppressed by controlling the storage elastic modulus G' of the present double-sided pressure-sensitive adhesive sheet to the aforementioned range and by controlling the thickness of the present double-sided pressure-sensitive adhesive sheet to the aforementioned range. The thickness of the present double-sided pressure-sensitive adhesive sheet that has a thickness of 150 μm or more may not withstand the compression stress, and the specimen after the flexing test tends to undergo occurrence of flexure, resulting in possibility of deteriorating the flexing durability.

From this standpoint, the thickness of the present double-sided pressure-sensitive adhesive sheet is more preferably 20 μm or more and 120 μm or less, and most preferably 25 μm or more and 100 μm or less.

(Production Method of Double-Sided Pressure-Sensitive Adhesive Sheet)

The production method of the present double-sided pressure-sensitive adhesive sheet may be a known production method. One example thereof will be shown below.

The (meth)acrylate ester (co)polymer (A), and depending on necessity, the crosslinking agent (B), the photoinitiator (C), and the other arbitrary components described above are mixed in the prescribed amounts, so as to produce the present pressure-sensitive adhesive composition.

The mixing method therefor is not particularly limited, and the order of mixing is also not particularly limited.

A heat treatment step may be included in the production of the present pressure-sensitive adhesive composition, and in this case, it is preferred that the heat treatment is performed after mixing the components of the present pressure-sensitive adhesive composition.

The apparatus for mixing is also not particularly limited, and examples thereof that can be used include a universal mixer, a planetary mixer, a Banbury mixer, a kneader, a gate mixer, a pressure kneader, a triple roll mixer, and a twin roll mixer. A solvent may also be used for mixing depending on necessity.

The present pressure-sensitive adhesive composition can be used as a solventless system containing no solvent as described above. The use of the solventless system may prevent any solvent from remaining, so as to provide advantages including the enhancement of the heat resistance and the light resistance.

The present pressure-sensitive adhesive composition thus prepared above is then cured, for example, through irradiation of an ultraviolet ray, so as to form the pressure-sensitive adhesive layer (i.e., the cured pressure-sensitive adhesive layer) in a sheet form having a single layer or a multilayer structure, and thus the present double-sided pressure-sensitive adhesive sheet can be produced. The irradiation amount of an ultraviolet ray is preferably 5,000 mJ/cm$^2$ or less, more preferably 4,000 mJ/cm$^2$ or less, and further preferably 3,000 mJ/cm$^2$ or less, as described above.

The present pressure-sensitive adhesive composition can also be used in such a manner that a composition containing the monomer component constituting the (meth)acrylate (co)polymer (A), and depending on necessity the crosslinking agent (B), the photoinitiator (C), and the other arbitrary components is prepared, and at the time of using the composition as the double-sided pressure-sensitive adhesive sheet, particularly the double-sided pressure-sensitive adhesive sheet for a flexible display, the polymerization reaction is performed to generate the (meth)acrylate (co)polymer (A).

The present double-sided pressure-sensitive adhesive sheet may be used in such a manner that the present pressure-sensitive adhesive composition is coated directly on an adherend to form the pressure-sensitive adhesive layer (i.e., the cured pressure-sensitive adhesive layer) in a sheet form having a single layer or a multilayer structure, and in addition, may be used as a double-sided pressure-sensitive adhesive sheet having a release film, which is obtained by molding the pressure-sensitive adhesive layer (i.e., the cured pressure-sensitive adhesive layer) in a sheet form having a single layer or a multilayer structure on the release film.

Examples of the material of the release film include a polyester film, a polyolefin film, a polycarbonate film, a polystyrene film, an acrylic resin film, a triacetyl cellulose film, and a fluorine resin film. Among these, a polyester film and a polyolefin film are particularly preferred.

The thickness of the release film is not particularly limited. From the standpoint of the workability and the handleability, the thickness thereof is preferably 25 μm to 500 μm, and particularly 38 μm or more or 250 μm or less is preferred, and 50 μm or more or 200 μm or less is more preferred.

The present double-sided pressure-sensitive adhesive sheet may also be produced by a method of molding of the present pressure-sensitive adhesive composition by direct extrusion molding without the use of the adherend or the release film as described above, or a method of injecting the composition into a mold.

Furthermore, an embodiment of the double-sided pressure-sensitive adhesive sheet may be formed by charging the present pressure-sensitive adhesive composition directly into between the component members for constituting an image display device as the adherends.

<<Laminate Including Flexible Component Member for Constituting Image Display Device>>

The laminate of the present invention including a flexible component member for constituting an image display device (which may be hereinafter referred to as a "present laminate") has a structure including the present double-sided pressure-sensitive adhesive sheet having the aforementioned characteristics and a flexible component member for constituting an image display device, which are laminated on each other.

The flexible component member for constituting an image display device may be particularly the flexible component members described above, and is preferably a combination of two or more kinds in the group consisting of a surface protective panel, a touch-sensitive panel, an optical film, and an organic EL (electronic luminescent) display panel, each having a substrate formed of a resin film, glass, or the like capable of being flexed or curved.

Among these, at least one of the flexible component members for constituting an image display device is preferably the flexible component member, and particularly preferably a flexible organic EL (electronic luminescent) display panel.

Preferred examples of the structure of the present laminate include configurations of (organic EL display panel)/(present double-sided pressure-sensitive adhesive double-sided pressure-sensitive adhesive sheet)/(release film), (surface protective panel)/(present double-sided pressure-sensitive adhesive sheet)/(release film), and (optical film)/(present double-sided pressure-sensitive adhesive sheet)/(release film). Preferred examples thereof also include configurations of (organic EL display panel)/(present double-sided pressure-sensitive adhesive sheet)/(touch-sensitive panel), (organic EL display panel)/(present double-sided pressure-sensitive adhesive sheet)/(surface protective panel), (organic EL display panel)/(present double-sided pressure-sensitive adhesive sheet)/(touch-sensitive panel)/(present double-sided pressure-sensitive adhesive sheet)/(surface protective panel), (optical film)/(present double-sided pressure-sensitive adhesive sheet)/(touch-sensitive panel), and (optical film)/(present double-sided pressure-sensitive adhesive sheet)/(touch-sensitive panel)/(present double-sided pressure-sensitive adhesive sheet)/(surface protective panel).

The present laminate preferably has a curved surface shape. Specific examples thereof include cases where the outer shape of the present laminate is an arc-like shape or other curved surfaces. More specifically, examples thereof include the laminate that has a surface protective panel having an arc-like shape, a catenary shape, a parabolic shape, a Bezier curve shape, a spline curve shape, a deflection curve shape, or other curved surface shapes.

<<Use of Double-Sided Pressure-Sensitive Adhesive Sheet>>

In the case where the present double-sided pressure-sensitive adhesive sheet described above is used for adhering a flexible component member for constituting an image display device, the pressure-sensitive adhesive may not protrude or may not suffer cohesion failure, and no flexure mark occurs on the double-sided pressure-sensitive adhesive sheet, even though the component member is used by flexing.

Accordingly, the present double-sided pressure-sensitive adhesive sheet has high flexing durability, and thus can be favorably used for adhering two flexible component members for constituting an image display device capable of being flexed or curved.

The flexible component member for constituting an image display device may be particularly the flexible component members described above, and is preferably a combination of two or more kinds in the group consisting of a surface protective panel, a touch-sensitive panel, an optical film, and an organic EL display panel, each having a substrate formed of a resin film, glass, or the like capable of being flexed or curved.

Among these, at least one of the flexible component members for constituting an image display device is preferably the flexible component member, and particularly preferably a flexible organic EL (electronic luminescent) display panel.

<<Kit for Forming Laminate>>

The kit for forming a laminate of the present invention for forming the present laminate (which may be hereinafter referred to as a "present kit") includes a flexible component member for constituting an image display device and a double-sided pressure-sensitive adhesive sheet for adhering the flexible component member, and the double-sided pressure-sensitive adhesive sheet is the present double-sided pressure-sensitive adhesive sheet.

The kit for forming a laminate for forming the present laminate means one set of materials for forming the present laminate, and is a combination of the materials that have not yet been bonded to each other.

The flexible component member for constituting an image display device may be particularly the flexible component members described above, and is preferably a combination of two or more kinds in the group consisting of a surface protective panel, a touch-sensitive panel, an optical film, and an organic EL (electronic luminescent) display panel, each having a substrate formed of a resin film, glass, or the like capable of being flexed or curved.

Among these, at least one of the flexible component members for constituting an image display device is preferably the flexible component member, and particularly preferably a flexible organic EL (electronic luminescent) display panel.

<<Explanation of Terms>>

In the description herein, the expression "from X to Y" (wherein X and Y each represent an arbitrary numeral) encompasses the meaning "X or more and Y or less" and also encompasses the meaning "preferably more than X" or "preferably less than Y", unless otherwise indicated.

The expression "X or more" (wherein X represents an arbitrary numeral) or "Y or less" (wherein Y represents an arbitrary numeral) encompasses the meaning "preferably more than X" or "preferably less than Y".

According to the definition of JIS, a "sheet" is generally a thin and flat product having a thickness that is smaller than the length and the width thereof, and a "film" is generally a product having a thickness that is extremely smaller than the length and the width thereof, and having a maximum thickness that is arbitrarily determined, which is generally supplied in the form of a roll (Japanese Industrial Standard, JIS K6900). However, there is no definite boundary between the sheet and the film, and there is no need of literally distinguishing these terms. In the present invention, accordingly, the case referred to as a "film" is assumed to include a "sheet", and the case referred to as a "sheet" is assumed to include a "film".

EXAMPLES

The present invention will be described with reference to examples below, but the present invention is not limited to the examples.

In Examples and Comparative Examples below, the measurement of properties and the treatments were performed in the following manners.

<Flexing Test>

(1) The double-sided pressure-sensitive adhesive sheets 1 to 16 produced in Examples and Comparative Examples were each cut into 50 mm×100 mm and then bonded to a PET film of 0.038 mm in thickness×50 mm×100 mm.

(2) After the bonding, the specimen was bonded to PET (0.1 mm×50 mm×100 mm) to produce a laminate.

(3) The laminate thus produced was tested with a flexing tester, DLDMLH-FS (produced by Yuasa System Co., Ltd.) under the following test condition with PET of 38 μm directed inside.

Curvature radius r: 3 mm
Test speed: 60 rpm
Number of times of test: 100,000

(4) The laminated having been subjected to the test was visually observed, and a specimen having a flexure mark on the double-sided pressure-sensitive adhesive sheet and a specimen having exfoliation of the double-sided pressure-sensitive adhesive sheet from the adherend were evaluated as "poor", whereas a specimen having no change in the visual observation was evaluated as "good".

In the visual observation, the observation by the projection test shown in FIG. 1 was performed.

The specimen having been subjected to the flexing test was disposed between the projector and the screen, and the flexure mark on the double-sided pressure-sensitive adhesive sheet and the exfoliation of the double-sided pressure-sensitive adhesive sheet from the adherend were determined by the presence or absence of distortion in the specimen having been subjected to the flexing test projected on the screen.

<Measurement of Storage Elastic Modulus G' and Glass Transition Temperature>

The double-sided pressure-sensitive adhesive sheets 1 to 16 produced in Examples and Comparative Examples each were measured for the storage elastic modulus G' by the shearing method with a viscoelasticity measuring device "Dynamic Analyzer RDA II", produced by Rheometric Scientific, Inc., under the following condition.

Fixture: parallel plates, 25 mm in diameter
Distortion: 0.5%
Frequency: 1 Hz
Temperature: −70 to 200° C. (measured at temperature raise rate of 3° C./min from −70° C.)
Thickness of specimen: 500 μm The double-sided pressure-sensitive adhesive sheets 1 to 16 produced in Examples and Comparative Examples each had a thickness that did not reach 500 μm, and thus the thickness was adjusted to 500 μm by laminating the pressure-sensitive adhesive layers.

The double-sided pressure-sensitive adhesive sheets 1 to 16 produced in Examples and Comparative Examples each were laminated to make a thickness of the pressure-sensitive adhesive layer of 1 mm, which was designated as a measurement specimen for the glass transition temperature.

The measurement specimen was measured by the shearing method with a viscoelasticity measuring device "Dynamic Analyzer RDA II", produced by Rheometric Scientific, Inc., under the following condition, and the temperature showing the maximum value of Tan δ was read. The temperature was designated as the glass transition temperature.

Fixture: parallel plates, 25 mm in diameter
Distortion: 0.5%
Frequency: 1 Hz

<Copper Thin Film Discoloration Test>

A copper thin film having a thickness of 50 Å was formed on a glass substrate (45 mm×45 mm) to produce a glass substrate for a copper thin film discoloration test.

One of the release films of each of the pressure-sensitive adhesive sheets produced in Examples and Comparative Examples was released therefrom, and a PET film ("Cosmoshine A4100", a trade name, produced by Toyobo Co., Ltd., 125 µm) was bonded to the exposed surface thereof with a hand roller. After cutting into a size of 45 mm×45 mm, the remaining release film was released, and the pressure-sensitive adhesive sheet was bonded to the glass substrate for a copper thin film discoloration test with a hand roller.

The specimen for a copper thin film discoloration test (i.e., the glass substrate for a copper thin film discoloration test having the pressure-sensitive adhesive sheet) was stored under an environment of 85° C. and 85% RH for approximately 1 hour, and after storing, the color of the specimen for a copper thin film discoloration test was visually confirmed. A specimen having gray color derived from the copper thin film remaining was evaluated as "good", whereas a specimen becoming substantially transparent was evaluated as "poor".

Example 1

To 100 parts by weight of an acrylate ester copolymer A, 0.6 parts by weight of "Esacure TZT" (4-methylbenzophenone), a trade name, produced by SiberHegner Japan Co., Ltd., and 1.0 part by weight of "Viscoat V260" (1,9-nonanediol diacrylate), a trade name, produced by Osaka Organic Chemical Industry Ltd., as photoinitiators, were added to provide an ultraviolet ray-curable pressure-sensitive adhesive composition 1.

The acrylate ester copolymer A had a composition obtained through copolymerization of 78.4% by mass of n-butyl acrylate, 19.6% by mass of 2-ethylhexyl acrylate, and 2.0% by mass of acrylic acid, and according to the GPC measurement, the acrylate ester copolymer A had Mw of 413,000, Mn of 145,000, Mw/Mn of 2.9, and a theoretical Tg of −57° C.

The pressure-sensitive adhesive composition 1 was held between release films formed of polyethylene terephthalate (PET) having a thickness of 75 µm and a thickness of 100 µm, and molded into a sheet form having a thickness of 0.1 mm by a hot-melt method, which was then irradiated with an ultraviolet ray of an accumulated light amount of 1,000 mJ/cm$^2$ through the release film with a high pressure mercury lamp, so as to provide a double-sided pressure-sensitive adhesive sheet 1.

The evaluation results of the double-sided pressure-sensitive adhesive sheet 1 are shown in Table 1.

Example 2

The pressure-sensitive adhesive composition 1 used in Example 1 was held between release films formed of polyethylene terephthalate having a thickness of 75 µm and a thickness of 100 µm, and molded into a sheet form having a thickness of 0.1 mm by a hot-melt method, which was then irradiated with an ultraviolet ray of an accumulated light amount of 500 mJ/cm$^2$ through the release film with a high pressure mercury lamp, so as to provide a double-sided pressure-sensitive adhesive sheet 2.

The evaluation results of the double-sided pressure-sensitive adhesive sheet 2 are shown in Table 1.

Example 3

The pressure-sensitive adhesive composition 1 used in Example 1 was held between release films formed of polyethylene terephthalate having a thickness of 75 µm and a thickness of 100 µm, and molded into a sheet form having a thickness of 0.1 mm by a hot-melt method, which was then irradiated with an ultraviolet ray of an accumulated light amount of 1,500 mJ/cm$^2$ through the release film with a high pressure mercury lamp, so as to provide a double-sided pressure-sensitive adhesive sheet 3.

The evaluation results of the double-sided pressure-sensitive adhesive sheet 3 are shown in Table 1.

Example 4

The pressure-sensitive adhesive composition 1 used in Example 1 was held between release films formed of polyethylene terephthalate having a thickness of 75 µm and a thickness of 100 µm, and molded into a sheet form having a thickness of 0.075 mm by a hot-melt method, which was then irradiated with an ultraviolet ray of an accumulated light amount of 1,000 mJ/cm$^2$ through the release film with a high pressure mercury lamp, so as to provide a double-sided pressure-sensitive adhesive sheet 4.

The evaluation results of the double-sided pressure-sensitive adhesive sheet 4 are shown in Table 1.

Example 5

The pressure-sensitive adhesive composition 1 used in Example 1 was held between release films formed of polyethylene terephthalate having a thickness of 75 µm and a thickness of 100 µm, and molded into a sheet form having a thickness of 0.025 mm by a hot-melt method, which was then irradiated with an ultraviolet ray of an accumulated light amount of 1,000 mJ/cm$^2$ through the release film with a high pressure mercury lamp, so as to provide a double-sided pressure-sensitive adhesive sheet 5.

The evaluation results of the double-sided pressure-sensitive adhesive sheet 5 are shown in Table 1.

Example 6

To 100 parts by weight of an acrylate ester copolymer B, 0.6 parts by weight of "Esacure TZT" (4-methylbenzophenone), a trade name, produced by SiberHegner Japan Co., Ltd., and 1.0 part by weight of "Viscoat V260" (1,9-nonanediol diacrylate), a trade name, produced by Osaka Organic Chemical Industry Ltd., as photoinitiators, and 0.5 parts of "BT-120" (1,2,3-benzotriazole), a trade name, produced by Johoku Chemical Co., Ltd., as a rust inhibitor were added to provide an ultraviolet ray-curable pressure-sensitive adhesive composition 2.

The acrylate ester copolymer B had a composition obtained through copolymerization of 78.4% by mass of n-butyl acrylate, 19.6% by mass of 2-ethylhexyl acrylate, and 2.0% by mass of acrylic acid, and according to the GPC measurement, the acrylate ester copolymer B had Mw of 520,000, Mn of 110,000, Mw/Mn of 4.7, and a theoretical Tg of −57° C.

The pressure-sensitive adhesive composition 2 was held between release films formed of polyethylene terephthalate (PET) having a thickness of 75 µm and a thickness of 100 µm, and molded into a sheet form having a thickness of 0.1 mm by a hot-melt method, which was then irradiated with an ultraviolet ray of an accumulated light amount of 1,000 mJ/cm$^2$ through the release film with a high pressure mercury lamp, so as to provide a double-sided pressure-sensitive adhesive sheet 6.

The evaluation results of the double-sided pressure-sensitive adhesive sheet 6 are shown in Table 1.

Example 7

A double-sided pressure-sensitive adhesive sheet 7 was obtained in the same manner as in Example 2 except that the pressure-sensitive adhesive composition 2 was used.

The evaluation results of the double-sided pressure-sensitive adhesive sheet 7 are shown in Table 1.

Example 8

The pressure-sensitive adhesive composition 2 used in Example 1 was held between release films formed of polyethylene terephthalate having a thickness of 75 µm and a thickness of 100 µm, and molded into a sheet form having a thickness of 0.1 mm by a hot-melt method, which was then irradiated with an ultraviolet ray of an accumulated light amount of 2,000 mJ/cm$^2$ through the release film with a high pressure mercury lamp, so as to provide a double-sided pressure-sensitive adhesive sheet 8.

The evaluation results of the double-sided pressure-sensitive adhesive sheet 8 are shown in Table 1.

Example 9

A double-sided pressure-sensitive adhesive sheet 9 was obtained in the same manner as in Example 4 except that the pressure-sensitive adhesive composition 2 was used.

The evaluation results of the double-sided pressure-sensitive adhesive sheet 9 are shown in Table 1.

Example 10

A double-sided pressure-sensitive adhesive sheet 10 was obtained in the same manner as in Example 5 except that the pressure-sensitive adhesive composition 2 was used.

The evaluation results of the double-sided pressure-sensitive adhesive sheet 10 are shown in Table 1.

Example 11

To 100 parts by weight of an acrylate ester copolymer C, 1.5 parts by weight of "Esacure TZT" (4-methylbenzophenone), a trade name, produced by SiberHegner Japan Co., Ltd., and 1.5 parts by weight of "Viscoat V260" (1,9-nonanediol diacrylate), a trade name, produced by Osaka Organic Chemical Industry Ltd., as photoinitiators, were added to provide an ultraviolet ray-curable pressure-sensitive adhesive composition 3.

The acrylate ester copolymer C had a composition obtained through copolymerization of 71% by mass of n-butyl acrylate, 26.2% by mass of 2-ethylhexyl acrylate, and 2.8% by mass of acrylamide, and according to the GPC measurement, the acrylate ester copolymer C had Mw of 470,000, Mn of 71,000, Mw/Mn of 6.6, and a theoretical Tg of −56° C.

The pressure-sensitive adhesive composition 3 was held between release films formed of polyethylene terephthalate (PET) having a thickness of 75 µm and a thickness of 100 µm, and molded into a sheet form having a thickness of 100 µm by a hot-melt method, which was then irradiated with an ultraviolet ray of an accumulated light amount of 1,000 mJ/cm$^2$ through the release film with a high pressure mercury lamp, so as to provide a double-sided pressure-sensitive adhesive sheet 11.

The evaluation results of the double-sided pressure-sensitive adhesive sheet 11 are shown in Table 1.

Comparative Example 1

The pressure-sensitive adhesive composition 1 used in Example 1 was held between release films formed of polyethylene terephthalate having a thickness of 75 µm and a thickness of 100 µm, and molded into a sheet form having a thickness of 0.1 mm by a hot-melt method, which was then irradiated with an ultraviolet ray of an accumulated light amount of 250 mJ/cm$^2$ through the release film with a high pressure mercury lamp, so as to provide a double-sided pressure-sensitive adhesive sheet 12.

The evaluation results of the double-sided pressure-sensitive adhesive sheet 12 are shown in Table 2.

Comparative Example 2

The pressure-sensitive adhesive composition 1 used in Example 1 was held between release films formed of polyethylene terephthalate having a thickness of 75 µm and a thickness of 100 µm, and molded into a sheet form having a thickness of 0.1 mm by a hot-melt method, which was then irradiated with an ultraviolet ray of an accumulated light amount of 2,500 mJ/cm$^2$ through the release film with a high pressure mercury lamp, so as to provide a double-sided pressure-sensitive adhesive sheet 13.

The evaluation results of the double-sided pressure-sensitive adhesive sheet 13 are shown in Table 2.

Comparative Example 3

To 100 parts by weight of an acrylate ester copolymer D, 0.15 parts by weight of "Esacure TZT" (4-methylbenzophenone), a trade name, produced by SiberHegner Japan Co., Ltd., as a photoinitiator, was added to provide an ultraviolet ray-curable pressure-sensitive adhesive composition 4.

The acrylate ester copolymer D had a composition obtained through random copolymerization of 75 parts by mass of 2-ethylhexyl acrylate (Tg of homopolymer: −70° C.), 20 parts by mass of vinyl acetate (Tg of homopolymer: +32° C.), and 5 parts by mass of acrylic acid (Tg of homopolymer: +106° C.), and according to the GPC measurement, the acrylate ester copolymer had Mw of 446,000, Mn of 97,800, Mw/Mn of 4.6, and a theoretical Tg of −50° C.

The pressure-sensitive adhesive composition 4 was held between release films formed of polyethylene terephthalate having a thickness of 75 µm and a thickness of 100 µm, and molded into a sheet form having a thickness of 0.1 mm by a hot-melt method, which was then irradiated with an ultraviolet ray of an accumulated light amount of 2,000 mJ/cm$^2$ through the release film with a high pressure mercury lamp, so as to provide a double-sided pressure-sensitive adhesive sheet 14.

The evaluation results of the double-sided pressure-sensitive adhesive sheet 14 are shown in Table 2.

Comparative Example 4

With 1,000 parts by weight of an acrylic adhesive (SK-Dyne 1882, a trade name, produced by Soken Chemical & Engineering Co., Ltd.), 1.85 parts by weight of an isocyanate curing agent (L-45, a trade name, produced by Soken Chemical & Engineering Co., Ltd.) and 0.5 part by weight of an epoxy curing agent (E-5XM, a trade name, produced by Soken Chemical & Engineering Co., Ltd.) were uniformly mixed to provide a pressure-sensitive adhesive solution.

The pressure-sensitive adhesive solution was coated to a thickness of 100 μm on a release surface of a silicone release PET film having a thickness of 38 μm with a hot-melt coater, and a silicone release PET film having a thickness of 50 μm was then bonded and laminated thereon, which was then sufficiently crosslinked through aging by allowing to stand at room temperature (23° C.) for 7 days, so as to provide a double-sided pressure-sensitive adhesive sheet 15.

The evaluation results of the double-sided pressure-sensitive adhesive sheet 15 are shown in Table 2.

Comparative Example 5

With 100 parts by mass of the acrylate ester copolymer D, 20 parts by mass of an ultraviolet ray-curable resin, pentaerythritol acrylate, ("PETIA", a trade name, produced by Daicel-SciTech, Ltd.) as a crosslinkable monomer, and 1.5 parts by mass of 4-methylbenzophenone as a photoinitiator were mixed to prepare a resin composition for an intermediate resin layer.

On a polyethylene terephthalate film having a thickness of 75 μm having been subjected to a release treatment, the resin composition for an intermediate resin layer was heat-melted and coated to a thickness of 50 μm with an applicator, which was then covered with a polyethylene terephthalate film having a thickness of 38 μm having been subjected to a release treatment.

The resin composition for an intermediate resin layer was crosslinked by irradiating with an ultraviolet ray of an accumulated light amount of 2,000 mJ/cm$^2$ through the polyethylene terephthalate film with a high pressure mercury lamp, so as to produce an intermediate resin layer (A-1).

With 100 parts by mass of the acrylate ester copolymer D, 2.0 parts by mass of 4-methylbenzophenone as a photoinitiator was mixed to prepare a composition for a pressure-sensitive adhesive. The composition for a pressure-sensitive adhesive was heat-melted and molded by coating into a sheet form having a thickness of 25 μm on a polyethylene terephthalate film having a thickness of 75 μm having been subjected to a release treatment, which was then covered with a polyethylene terephthalate film having a thickness of 38 μm having been subjected to a release treatment. The composition for a pressure-sensitive adhesive was crosslinked by irradiating with an ultraviolet ray of an accumulated light amount of 2,000 mJ/cm$^2$ through the polyethylene terephthalate film with a high pressure mercury lamp, so as to produce a pressure-sensitive adhesive layer (B-1).

A pressure-sensitive adhesive layer (B-1') was produced in the same manner as the pressure-sensitive adhesive layer (B-1) except that the substrate to be coated was changed to a polyethylene terephthalate film having a thickness of 50 μm having been subjected to a release treatment.

The PET films on both sides of the intermediate resin layer (A-1) were sequentially released and removed, and the exposed pressure-sensitive adhesive surfaces of the pressure-sensitive adhesive layers (B-1) and (B-1') obtained by removing the PET film on one side thereof were sequentially bonded to both surfaces of (A-1) with a laminator, so as to produce a multilayer double-sided pressure-sensitive adhesive sheet 16 (thickness: 100 μm).

The evaluation results of the double-sided pressure-sensitive adhesive sheet 16 are shown in Table 2.

TABLE 1

|  | Example 1 | Example 2 | Example 3 | Example 4 | Example 5 | Example 6 |
|---|---|---|---|---|---|---|
| Sheet thickness (μm) | 100 | 100 | 100 | 75 | 25 | 100 |
| 50° C. Storage elastic modulus G' (Pa) | $1.9 \times 10^4$ | $1.4 \times 10^4$ | $1.9 \times 10^4$ | $1.2 \times 10^4$ | $1.2 \times 10^4$ | $1.4 \times 10^4$ |
| 100° C. Storage elastic modulus G' (Pa) | $1.3 \times 10^4$ | $5.8 \times 10^3$ | $1.2 \times 10^4$ | $4.8 \times 10^3$ | $4.8 \times 10^3$ | $5.8 \times 10^3$ |
| 150° C. Storage elastic modulus G' (Pa) | — | — | — | — | — | $4.0 \times 10^3$ |
| Natural logarithm of base of exponential curve | — | — | — | — | — | −0.007 |
| Glass transition temperature (Tg, ° C.) | −30 | −30 | −30 | −30 | −30 | −30 |
| Accumulated light amount of ultraviolet ray (mJ/cm$^2$) | 1000 | 500 | 1500 | 1000 | 1000 | 1000 |
| Result of flexing test | good | good | good | good | good | good |
| Result of copper thin film discoloration test | — | — | — | — | — | good |

|  | Example 7 | Example 8 | Example 9 | Example 10 | Example 11 |
|---|---|---|---|---|---|
| Sheet thickness (μm) | 100 | 100 | 75 | 25 | 100 |
| 50° C. Storage elastic modulus G' (Pa) | $1.1 \times 10^4$ | $1.9 \times 10^4$ | $1.4 \times 10^4$ | $1.4 \times 10^4$ | $1.7 \times 10^4$ |
| 100° C. Storage elastic modulus G' (Pa) | $3.1 \times 10^3$ | $1.3 \times 10^4$ | $5.8 \times 10^3$ | $5.8 \times 10^3$ | $1.2 \times 10^4$ |
| 150° C. Storage elastic modulus G' (Pa) | $2.2 \times 10^3$ | $1.3 \times 10^4$ | $4.0 \times 10^3$ | $4.0 \times 10^3$ | $1.5 \times 10^3$ |
| Natural logarithm of base of exponential curve | −0.007 | −0.0002 | −0.007 | −0.007 | 0.003 |
| Glass transition temperature (Tg, ° C.) | −30 | −30 | −30 | −30 | −25 |
| Accumulated light amount of ultraviolet ray (mJ/cm$^2$) | 500 | 2000 | 1000 | 1000 | 1000 |
| Result of flexing test | good | good | good | good | good |
| Result of copper thin film discoloration test | good | good | good | good | good |

TABLE 2

|  | Comparative Example 1 | Comparative Example 2 | Comparative Example 3 | Comparative Example 4 | Comparative Example 5 |
|---|---|---|---|---|---|
| Sheet thickness (μm) | 100 | 100 | 100 | 100 | 100 |
| 50° C. Storage elastic modulus G' (Pa) | $1.1 \times 10^4$ | $2.2 \times 10^4$ | $1.8 \times 10^4$ | $3.2 \times 10^4$ | $2.5 \times 10^4$ |
| 100° C. Storage elastic modulus G' (Pa) | $1.8 \times 10^3$ | $3.1 \times 10^3$ | $3.4 \times 10^3$ | $2.4 \times 10^3$ | $7.4 \times 10^3$ |
| Glass transition temperature (Tg, ° C.) | −30 | −30 | −15 | −15 | −15 |
| Accumulated light amount of ultraviolet ray (mJ/cm$^2$) | 250 | 2500 | — | — | 2000 |
| 150° C. Storage elastic modulus G' (Pa) | — | — | — | — | $3.2 \times 10^3$ |
| Natural logarithm of base of exponential curve | — | — | — | — | −0.017 |
| Result of flexing test | poor | poor | poor | poor | poor |
| Result of copper thin film discoloration test | good | good | poor | poor | poor |

The double-sided pressure-sensitive adhesive sheet 12 of Comparative Example 1 suffered exfoliation in the flexing test since the storage elastic modulus G' was not in the prescribed range but was too low.

The double-sided pressure-sensitive adhesive sheet 13 of Comparative Example 2 suffered flexure in the flexing test since the storage elastic modulus G' was not in the prescribed range but was too high.

The double-sided pressure-sensitive adhesive sheet 14 of Comparative Example 3 and the double-sided pressure-sensitive adhesive sheet 15 of Comparative Example 4 suffered flexure in the flexing test since the glass transition temperature was not in the prescribed range but was too high.

The double-sided pressure-sensitive adhesive sheet 16 of Comparative Example 5 suffered flexure in the flexing test since the glass transition temperature was not in the prescribed range but was too high. Furthermore, a phenomenon like blistering was simultaneously observed around the flexed portion in the flexing test since the natural logarithm of the base of the exponential curve was not in the prescribed range but was too high.

It was understood from the above that high flexing resistance was obtained by controlling the glass transition temperature and the storage elastic modulus G' of the double-sided pressure-sensitive adhesive sheet within the prescribed ranges.

Industrial Applicability

According to the present invention, a double-sided pressure-sensitive adhesive sheet that is favorable for adhering a flexible component member for constituting an image display device capable of being flexed or curved, and the double-sided pressure-sensitive adhesive sheet can be applied to adhesion of a flexible display without occurrence of flexure and exfoliation.

Reference Signs List

1: Projector
2: Specimen after flexing test
3: Screen
4: Flexure mark

The invention claimed is:

1. A double-sided pressure-sensitive adhesive sheet having no substrate, comprising a pressure-sensitive adhesive composition containing a (meth)acrylate ester (co)polymer (A), and having a glass transition temperature (Tg) defined by a Tan δ peak temperature of dynamic viscoelasticity in a range of −50° C. to −20° C., a storage elastic modulus G' at a frequency of 1 Hz and a temperature 100° C. in a range of $2.0 \times 10^3$ to $3.0 \times 10^4$ Pa, and a thickness of 10 μm or more and 150 μm or less.

2. The double-sided pressure-sensitive adhesive sheet according to claim 1, wherein when an exponential curve is drawn to pass through two points of a storage elastic modulus G'(100) at a frequency of 1 Hz and a temperature of 100° C. and a storage elastic modulus G'(150) at a frequency of 1 Hz and a temperature of 150° C. in a storage elastic modulus-temperature graph plotting a temperature as the abscissa axis and a logarithm of a storage shear elastic modulus (G') as the ordinate axis for the double-sided pressure-sensitive adhesive sheet, the double-sided pressure-sensitive adhesive sheet has a natural logarithm of a base of the exponential curve of −0.010 or more.

3. The double-sided pressure-sensitive adhesive sheet according to claim 1, wherein the pressure-sensitive adhesive composition further contains a crosslinking agent (B).

4. The double-sided pressure-sensitive adhesive sheet according to claim 1, wherein the pressure-sensitive adhesive composition further contains a photoinitiator (C).

5. The double-sided pressure-sensitive adhesive sheet according to claim 1, wherein the (meth)acrylate ester (co)polymer (A) does not contain a carboxy group-containing monomer as a (co)polymerization component, and contains at least any one or both of a hydroxy group-containing monomer and an amide group-containing monomer as a (co)polymerization component.

6. The double-sided pressure-sensitive adhesive sheet according to claim 1, wherein the (meth)acrylate ester (co)polymer (A) contains an alkyl (meth)acrylate having a (meth)acryloyl group bonded to a tertiary carbon atom as a (co)polymerization component.

7. The double-sided pressure-sensitive adhesive sheet according to claim 4, wherein the photoinitiator (C) is a hydrogen abstraction type photoinitiator.

8. The double-sided pressure-sensitive adhesive sheet according to claim 1, wherein the (meth)acrylate ester (co)polymer contains a monomer that generates a radical active species on receiving light.

9. The double-sided pressure-sensitive adhesive sheet according to claim 1, wherein the double-sided pressure-sensitive adhesive sheet has a storage elastic modulus G' at a frequency of 1 Hz and a temperature 50° C. in a range of $3.0 \times 10^2$ to $4.0 \times 10^4$ Pa.

10. A double-sided pressure-sensitive adhesive sheet for a flexible display comprising a double-sided pressure-sensitive adhesive sheet according to claim 1, wherein the double-sided pressure-sensitive adhesive sheet is for adhering a flexible component member for constituting an image display device constituting a flexible display.

11. A laminate comprising a flexible component member for constituting an image display device capable of being flexed or curved, and the double-sided pressure-sensitive adhesive sheet of claim 1.

12. The laminate according to claim 11, wherein when an exponential curve is drawn to pass through two points of a storage elastic modulus G'(100) at a frequency of 1 Hz and a temperature of 100° C. and a storage elastic modulus G'(150) at a frequency of 1 Hz and a temperature of 150° C. in a storage elastic modulus-temperature graph plotting a temperature as the abscissa axis and a logarithm of a storage shear elastic modulus (G') as the ordinate axis for the double-sided pressure-sensitive adhesive sheet, the double-sided pressure-sensitive adhesive sheet has a natural logarithm of a base of the exponential curve of −0.010 or more.

13. The laminate according to claim 11, wherein the pressure-sensitive adhesive composition further contains a crosslinking agent (B).

14. The laminate according to claim 11, wherein the pressure-sensitive adhesive composition further contains a photoinitiator (C).

15. The laminate according to claim 14, wherein the photoinitiator (C) is a hydrogen abstraction type photoinitiator.

16. The laminate according to claim 11, wherein the (meth)acrylate ester (co)polymer (A) does not contain a carboxy group-containing monomer as a (co)polymerization component, and contains at least any one or both of a hydroxy group-containing monomer and an amide group-containing monomer as a (co)polymerization component.

17. The laminate according to claim 11, wherein the (meth)acrylate ester (co)polymer (A) contains an alkyl (meth)acrylate having a (meth)acryloyl group bonded to a tertiary carbon atom as a (co)polymerization component.

18. The laminate according to claim 11, wherein the (meth)acrylate ester (co)polymer (A) contains a monomer that generates a radical active species on receiving light.

19. The laminate according to claim 11, wherein the double-sided pressure-sensitive adhesive sheet has a storage elastic modulus G' at a frequency of 1 Hz and a temperature 50° C. in a range of $3.0 \times 10^2$ to $4.0 \times 10^4$ Pa.

20. The laminate according to claim 11, wherein the flexible component member for constituting an image display device is a combination of two or more kinds in the group consisting of a surface protective panel, a touch-sensitive panel, an optical film, and an organic EL (electronic luminescent) display panel.

21. The laminate according to claim 11, wherein the laminate has a curved surface shape.

22. A flexible display comprising the laminate according to claim 11.

* * * * *